US012589298B2

(12) United States Patent
Wang et al.

(10) Patent No.: US 12,589,298 B2
(45) Date of Patent: Mar. 31, 2026

(54) IMAGE PREDICTION METHOD, ELECTRONIC DEVICE, AND STORAGE MEDIUM

(71) Applicant: Honor Device Co., Ltd., Shenzhen (CN)

(72) Inventors: Yuchen Wang, Shenzhen (CN); Xin Bai, Shenzhen (CN); Zhaoyang Yin, Shenzhen (CN); Wei Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 419 days.

(21) Appl. No.: 18/025,975

(22) PCT Filed: Jan. 21, 2022

(86) PCT No.: PCT/CN2022/073226
§ 371 (c)(1),
(2) Date: Mar. 13, 2023

(87) PCT Pub. No.: WO2022/257474
PCT Pub. Date: Dec. 15, 2022

(65) Prior Publication Data
US 2023/0364510 A1 Nov. 16, 2023

(30) Foreign Application Priority Data
Jun. 11, 2021 (CN) .......................... 202110654388.7

(51) Int. Cl.
*A63F 13/52* (2014.01)
*G06T 1/60* (2006.01)
(Continued)

(52) U.S. Cl.
CPC ................ *A63F 13/52* (2014.09); *G06T 1/60* (2013.01); *G06T 7/246* (2017.01); *G06T 11/00* (2013.01); *A63F 2300/538* (2013.01)

(58) Field of Classification Search
CPC .. A63F 13/52; A63F 2300/538; A63F 13/837; G06T 1/60; G06T 7/246; G06T 11/00; G06T 1/20
See application file for complete search history.

(56) References Cited

U.S. PATENT DOCUMENTS

| | | | | | |
|---|---|---|---|---|---|
| 5,742,289 A | * | 4/1998 | Naylor | ................... | H04N 19/51 |
| | | | | | 375/E7.176 |
| 5,786,860 A | * | 7/1998 | Kim | ....................... | H04N 19/56 |
| | | | | | 375/E7.25 |

(Continued)

FOREIGN PATENT DOCUMENTS

| | | |
|---|---|---|
| CN | 1913632 A | 2/2007 |
| CN | 104882089 A | 9/2015 |

(Continued)

OTHER PUBLICATIONS

Machine translation of Chinese patent publication CN 109672886 A, downloaded from https://worldwide.espacenet.com on Sep. 9, 2025. (Year: 2005).*

(Continued)

*Primary Examiner* — David L Lewis
*Assistant Examiner* — Matthew D Hoel
(74) *Attorney, Agent, or Firm* — Leydig, Voit & Mayer, Ltd.

(57) ABSTRACT

This application provides an image prediction method, an electronic device, and a storage medium. The prediction method includes: obtaining a drawing instruction stream of a first image frame, wherein the first image frame contains one or more first objects; calculating a first motion vector between the one or more first objects and the one or more (Continued)

third objects, wherein the one or more third objects match the one or more first objects; obtaining a second motion vector, wherein the second motion vector is a motion vector between the one or more third objects and one or more fourth objects in a third image frame; calculating a third motion vector based on a first motion vector and a second motion vector; obtaining a first prediction image frame based on the first motion vector, the third motion vector, and the one or more first objects.

17 Claims, 11 Drawing Sheets

(51) Int. Cl.
G06T 7/246 (2017.01)
G06T 11/00 (2006.01)

(56) References Cited

U.S. PATENT DOCUMENTS

| | | | | |
|---|---|---|---|---|
| 5,825,423 A * | 10/1998 | Jung | | H04N 19/51 |
| | | | | 375/240.14 |
| 5,896,176 A * | 4/1999 | Das | | H04N 19/166 |
| | | | | 714/824 |
| 7,038,676 B2 * | 5/2006 | Iwata | | H04N 19/51 |
| | | | | 345/473 |
| 7,746,345 B2 * | 6/2010 | Hunter | | G06T 13/40 |
| | | | | 345/475 |
| 7,916,788 B2 | 3/2011 | Asano et al. | | |
| 7,990,389 B2 * | 8/2011 | Barone | | G06T 15/005 |
| | | | | 345/475 |
| 8,147,339 B1 * | 4/2012 | Perry | | A63F 13/355 |
| | | | | 463/31 |
| 8,506,402 B2 * | 8/2013 | Gault | | H04L 67/131 |
| | | | | 463/40 |
| 8,560,331 B1 * | 10/2013 | Pereira | | H04N 21/439 |
| | | | | 704/503 |
| 8,613,673 B2 * | 12/2013 | Perry | | A63F 13/358 |
| | | | | 463/42 |
| 8,840,476 B2 * | 9/2014 | Perry | | H04L 65/4025 |
| | | | | 463/42 |
| 8,888,592 B1 * | 11/2014 | Pereira | | A63F 13/12 |
| | | | | 463/35 |
| 8,926,435 B2 * | 1/2015 | Perry | | A63F 13/355 |
| | | | | 463/42 |
| 8,968,087 B1 * | 3/2015 | Gault | | A63F 13/2145 |
| | | | | 463/31 |
| 9,769,494 B2 * | 9/2017 | Mammou | | H04N 19/139 |

| | | | | |
|---|---|---|---|---|
| 9,878,240 B2 * | 1/2018 | Gault | | A63F 13/77 |
| 10,194,059 B2 * | 1/2019 | Uejima | | G06T 7/215 |
| 10,319,318 B2 | 6/2019 | Kim et al. | | |
| 10,395,127 B2 * | 8/2019 | Uejima | | G06T 7/246 |
| 10,834,413 B2 * | 11/2020 | Farre Guiu | | H04N 19/649 |
| 2001/0040924 A1 * | 11/2001 | Hori | | G06T 7/246 |
| | | | | 375/240.16 |
| 2003/0229719 A1 * | 12/2003 | Iwata | | H04N 19/51 |
| | | | | 345/418 |
| 2007/0036217 A1 * | 2/2007 | Asano | | H04N 19/16 |
| | | | | 375/240.16 |
| 2008/0063236 A1 * | 3/2008 | Ikenoue | | G06V 10/24 |
| | | | | 382/103 |
| 2010/0289826 A1 | 11/2010 | Park et al. | | |
| 2015/0294143 A1 * | 10/2015 | Wells | | G06V 40/103 |
| | | | | 348/159 |
| 2018/0310019 A1 * | 10/2018 | Kopietz | | A63F 13/86 |
| 2021/0366133 A1 | 11/2021 | Shao et al. | | |
| 2023/0030020 A1 | 2/2023 | Li et al. | | |
| 2023/0269393 A1 | 8/2023 | Kopietz | | |

FOREIGN PATENT DOCUMENTS

| | | | |
|---|---|---|---|
| CN | 105183566 A | 12/2015 | |
| CN | 105184847 A | 12/2015 | |
| CN | 105225264 A | 1/2016 | |
| CN | 108027974 A | 5/2018 | |
| CN | 109547791 A | 3/2019 | |
| CN | 109672886 A | 4/2019 | |
| CN | 109712224 A | 5/2019 | |
| CN | 109887065 A | 6/2019 | |
| CN | 110232654 A | 9/2019 | |
| CN | 111052182 A | 4/2020 | |
| CN | 112190938 A | 1/2021 | |
| CN | 112203095 A | 1/2021 | |
| CN | 112232322 A | 1/2021 | |
| CN | 113797530 A | 12/2021 | |
| CN | 114470750 A | 5/2022 | |
| EP | 3043320 A1 | 7/2016 | |
| JP | 11305908 A | 11/1999 | |
| JP | 2006311589 A | 11/2006 | |
| KR | 1020100060102 A | 6/2010 | |
| WO | 2017104010 A1 | 6/2017 | |
| WO | 2020143191 A1 | 7/2020 | |

OTHER PUBLICATIONS

Ketan Kapse, "An Overview of Current Deep Learned Rendering Technologies," 2021 7th International Conference on Advanced Computing and Communication Systems (ICACCS), 6 pages (Mar. 19, 2021).

* cited by examiner

Electronic device 100

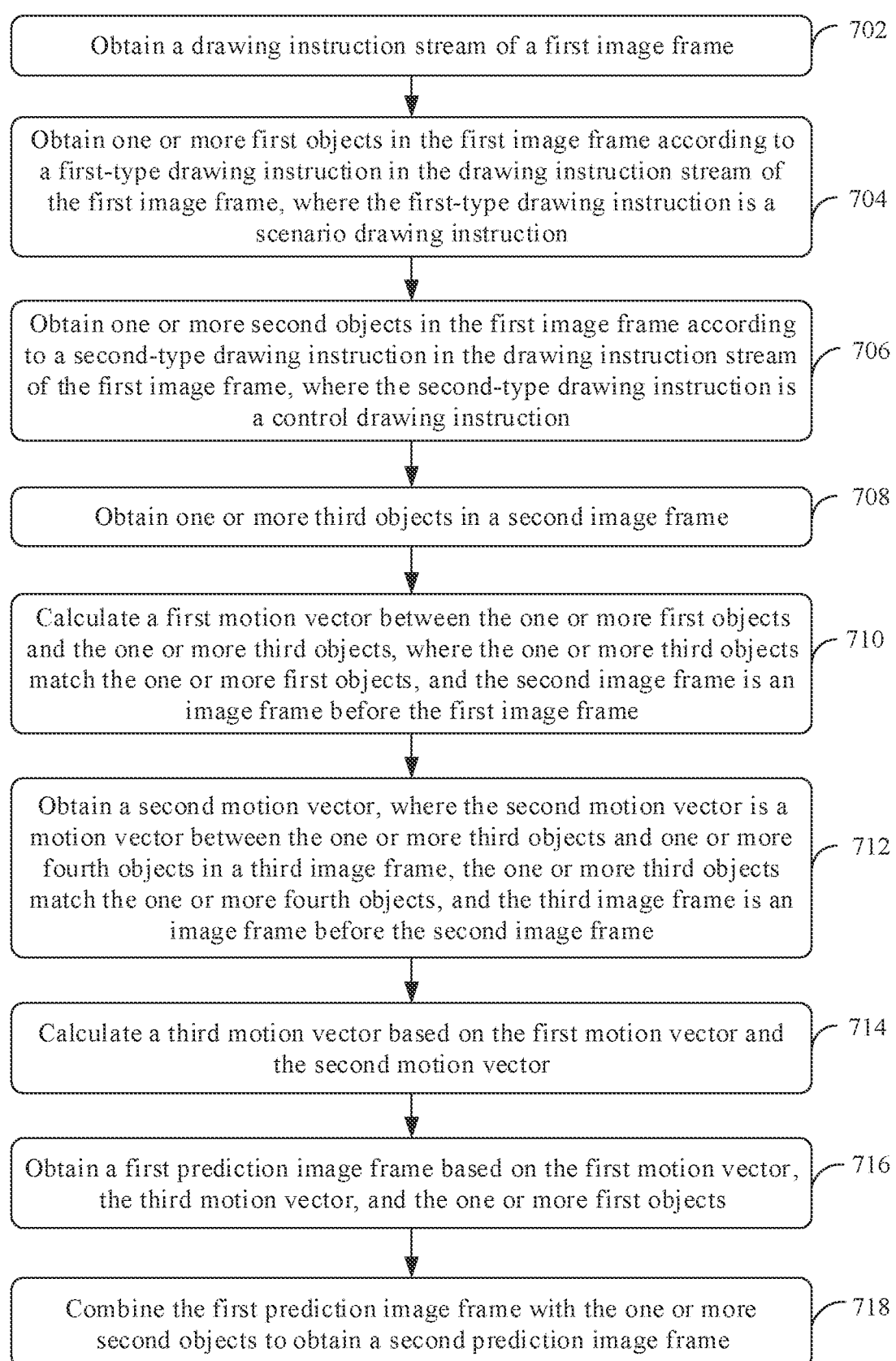

Obtain a drawing instruction stream of a first image frame — 702

Obtain one or more first objects in the first image frame according to a first-type drawing instruction in the drawing instruction stream of the first image frame, where the first-type drawing instruction is a scenario drawing instruction — 704

Obtain one or more second objects in the first image frame according to a second-type drawing instruction in the drawing instruction stream of the first image frame, where the second-type drawing instruction is a control drawing instruction — 706

Obtain one or more third objects in a second image frame — 708

Calculate a first motion vector between the one or more first objects and the one or more third objects, where the one or more third objects match the one or more first objects, and the second image frame is an image frame before the first image frame — 710

Obtain a second motion vector, where the second motion vector is a motion vector between the one or more third objects and one or more fourth objects in a third image frame, the one or more third objects match the one or more fourth objects, and the third image frame is an image frame before the second image frame — 712

Calculate a third motion vector based on the first motion vector and the second motion vector — 714

Obtain a first prediction image frame based on the first motion vector, the third motion vector, and the one or more first objects — 716

Combine the first prediction image frame with the one or more second objects to obtain a second prediction image frame — 718

IMAGE PREDICTION METHOD, ELECTRONIC DEVICE, AND STORAGE MEDIUM

CROSS-REFERENCE TO RELATED APPLICATIONS

This application is a national stage of International Application No. PCT/CN2022/073226, filed on Jan. 21, 2022, which claims priority to Chinese Patent Application No. 202110654388.7, filed on Jun. 11, 2021. The disclosures of both of the aforementioned application are hereby incorporated by reference in their entireties.

TECHNICAL FIELD

This application relates to the field of terminal technologies, and in particular, to an image frame prediction method, an electronic device, and a storage medium.

BACKGROUND

As game picture quality is increasingly good and special effects are increasingly refined, a performance requirement on a terminal device is increasingly high during game running. When the terminal device runs a game, especially a heavy-load game (such as a gun fight game), a relatively large quantity of resources need to be occupied. Consequently, some games cannot be run smoothly on the terminal such as a mobile phone, and frame drop, fast power consumption, heating of the mobile phone, and the like may occur.

SUMMARY

To resolve the foregoing technical problem, according to a first aspect, this application provides an image prediction method, applied to an electronic device, and including:

obtaining a drawing instruction stream of a first image frame, where the first image frame may be, for example, a real frame N shown in FIG. 2 and FIG. 5;

obtaining one or more first objects in the first image frame according to a first-type drawing instruction in the drawing instruction stream of the first image frame, where the first-type drawing instruction is a scenario drawing instruction, and the first object may be an object 502, an object 504, an object 506, an object 508, or the like shown in the real frame N;

obtaining one or more second objects in the first image frame according to a second-type drawing instruction in the drawing instruction stream of the first image frame, where the second-type drawing instruction is a control drawing instruction, the control drawing instruction is also referred to as a UI drawing instruction, the second object may be a control, a blood bar, or the like, and a location of the second object in an image frame is generally fixed;

obtaining one or more third objects in a second image frame, where the second image frame may be, for example, a real frame N−2 shown in FIG. 2 and FIG. 5, and the one or more third objects may be an object 502, an object 504, an object 506, and an object 508 in the real frame N−2;

calculating a first motion vector between the one or more first objects and the one or more third objects, where the one or more third objects match the one or more first objects, and the second image frame is an image frame before the first image frame; for example, the object 502 in the real frame N−2 matches the object 502 shown in the real frame N, the object 504 in the real frame N−2 matches the object 504 shown in the real frame N, and the first motion vector may include a motion vector between the object 502 in the real frame N−2 and the object 502 in the real frame N, and a motion vector between the object 504 in the real frame N−2 and the object 504 in the real frame N;

obtaining a second motion vector, where the second motion vector is a motion vector between the one or more third objects and one or more fourth objects in a third image frame, the one or more third objects match the one or more fourth objects, and the third image frame is an image frame before the second image frame; for example, the third image frame may be a real frame N−4 shown in FIG. 2 and FIG. 5, and the one or more fourth objects may be an object 502, an object 504, an object 506, and an object 508 in the real frame N−4; The second motion vector may include a motion vector between the object 502 in the real frame N−4 and the object 502 in the real frame N−2, and a motion vector between the object 504 in the real frame N−4 and the object 504 in the real frame N−2.

calculating a third motion vector based on the first motion vector and the second motion vector, where the third motion vector may be, for example, half of a difference between the first motion vector and the second motion vector;

obtaining a first prediction image frame based on the first motion vector, the third motion vector, and the one or more first objects, where the first prediction image frame is a prediction scenario image corresponding to a real frame N+1 shown in FIG. 2; and combining the first prediction image frame with the one or more second objects, to obtain a second prediction image frame, where the second prediction image frame may indicate a prediction frame N+1. Specifically, the location of the second object in the image frame is generally fixed. Therefore, the second object may be directly added to a fixed location of the first prediction image frame, to obtain the prediction frame N+1.

In an embodiment of this application, before the obtaining a drawing instruction stream of a first image frame, the method includes: replacing a first pointer in a pointer list with a second pointer, where the first pointer points to a first function, the second pointer points to a second function, the first function is used to draw the first image frame, and the second function is used to identify a drawing instruction in the drawing instruction stream of the first image frame. For example, the first pointer may be an original function pointer P1 in a graphics library (where the pointer P1 points to an implementation function corresponding to an original function in the graphics library), and the second pointer may be an interception function pointer P2 (where the pointer P2 may point to an implementation function corresponding to an original function in an identification module).

In an embodiment of this application, before the obtaining one or more first objects in the first image frame according to a first-type drawing instruction in the drawing instruction stream, the method further includes: identifying the drawing instruction in the drawing instruction stream of the first image frame based on the second function, to determine the first-type drawing instruction, the second-type drawing instruction, and a third-type drawing instruction in the drawing instruction stream of the first image frame.

In an embodiment of this application, before the obtaining one or more third objects in a second image frame, the method further includes: obtaining a drawing instruction stream of the second image frame; obtaining the one or more third objects in the second image frame according to a first-type drawing instruction in the drawing instruction stream of the second image frame; and storing the one or more third objects.

In an embodiment of this application, the obtaining one or more third objects in a second image frame includes: obtaining the one or more third objects according to the third-type drawing instruction in the drawing instruction stream of the first image frame, where the third-type drawing instruction is an image display instruction. For example, the electronic device may obtain one or more third objects in the real frame N–2 when identifying an image display instruction in a drawing instruction stream of the real frame N.

In an embodiment of this application, the one or more first objects include a fifth object, the one or more third objects include a sixth object, the one or more fourth objects include a seventh object, that the one or more first objects match the one or more third objects is that an identifier of the fifth object is the same as an identifier of the sixth object, and that the one or more third objects match the one or more fourth objects is that the identifier of the fifth object is the same as an identifier of the seventh object. For example, the fifth object may be the object 502 in the real frame N, the sixth object may be the object 502 in the real frame N–2, and the seventh object may be the object 502 in the real frame N–4. That the one or more first objects match the one or more third objects is that an identifier of the object 502 in the real frame N is the same as an identifier of the object 502 in the real frame N–2, and that the one or more third objects match the one or more fourth objects is that the identifier of the object 502 in the real frame N–2 is the same as an identifier of the object 502 in the real frame N–4.

In an embodiment of this application, P image frames are spaced between the first image frame and the second image frame, Q image frames are spaced between the second image frame and the third image frame, and P and Q are positive integers. P and Q may be the same or different.

In an embodiment of this application, the one or more first objects include the fifth object and an eighth object, the one or more third objects include the sixth object and a ninth object, the identifier of the fifth object is the same as the identifier of the sixth object, and an identifier of the eighth object is the same as an identifier of the ninth object. For example, the eighth object may be the object 504 in the real frame N, and the ninth object may be the object 504 in the real frame N–2. After the obtaining one or more first objects in the first image frame, the method further includes:

obtaining vertex information of the sixth object based on the identifier of the fifth object, where vertex information of the object 502 in the real frame N–2 is, for example, obtained by using the identifier of the object 502 in the real frame N, and vertex information of a person corresponding to the real frame N–2 may be obtained by using the identifier of the object 502 in the real frame N, that is, an identifier of the person;

determining, based on that vertex information of the fifth object is different from the vertex information of the sixth object, that the fifth object is a dynamic object, where vertex information of the object 502 in the real frame N is compared with the vertex information of the object 502 in the real frame N–2, and if the two pieces of vertex information are different, the object 502 in the real frame N is a dynamic object;

obtaining vertex information of the ninth object based on the identifier of the eighth object, where as described above, the eighth object may be the object 504 in the real frame N, and the ninth object may be the object 504 in the real frame N–2; for example, the object 504 is specifically a tree, vertex information of the object 504 in the real frame N–2 may be obtained by using an identifier of the object 504 in the real frame N, that is, an identifier of the tree, and the vertex information of the object 504 in the real frame N–2 may be, for example, obtained from a cache.

determining, based on that vertex information of the eighth object is the same as the vertex information of the ninth object, that the eighth object is a static object, where for example, if vertex information of the object 504 in the real frame N is consistent with the vertex information of the object 504 in the real frame N–2, the object 504 in the real frame N is a static object; and recording the fifth object as the dynamic object, and recording the eighth object as the static object.

In an embodiment of this application, the calculating a first motion vector between the one or more first objects and the one or more third objects includes:

calculating a first motion component of the first motion vector based on coordinates of the fifth object and coordinates of the sixth object, where a first motion component between the object 502 in the real frame N and the object 502 in the real frame N–2 may be, for example, calculated based on coordinates of the object 502 in the real frame N and coordinates of the object 502 in the real frame N–2; and calculating a second motion component of the first motion vector based on coordinates of the eighth object and coordinates of the ninth object, where a second motion component between the object 504 in the real frame N and the object 504 in the real frame N–2 may be, for example, calculated based on coordinates of the object 504 in the real frame N and coordinates of the object 504 in the real frame N–2.

In an embodiment of this application, before the obtaining a second motion vector, the method includes:

obtaining a drawing instruction stream of the third image frame, and obtaining the one or more fourth objects in the third image frame according to a first-type drawing instruction in the drawing instruction stream of the third image frame, where the object 502, the object 504, and the object 508 in the real frame N–4 may be, for example, obtained according to a scenario drawing instruction in a drawing instruction stream of the real frame N–4;

storing the one or more fourth objects; and after the obtaining one or more third objects in a second image frame, the method further includes: calculating the second motion vector between the one or more third objects and the one or more fourth objects, where as described above, the second motion vector may include, for example, a motion vector between the object 502 in the real frame N–4 and the object 502 in the real frame N–2, a motion vector between the object 508 in the real frame N–4 and the object 508 in the real frame N–2, and a motion vector between the object 504 in the real frame N–4 and the object 504 in the real frame N–2; and storing the second motion vector.

In an embodiment of this application, the one or more fourth objects include the seventh object and a tenth object, the identifier of the sixth object is the same as the identifier of the seventh object, and the identifier of the ninth object is the same as an identifier of the tenth object, where for example, as described above, the seventh object may be the object 502 in the real frame N−4, the sixth object may be the object 502 in the real frame N−2, the ninth object may be the object 504 in the real frame N−2, and the tenth object may be the object 504 in the real frame N−4; and the calculating the second motion vector between the one or more third objects and the one or more fourth objects includes:

calculating a first motion component of the second motion vector based on the coordinates of the sixth object and coordinates of the seventh object, where a first motion component between the object 502 in the real frame N−4 and the object 502 in the real frame N−2 may be, for example, calculated based on the coordinates of the object 502 in the real frame N−2 and coordinates of the object 502 in the real frame N−4; and calculating a second motion component of the second motion vector based on the coordinates of the ninth object and coordinates of the tenth object, where a second motion component between the object 504 in the real frame N−4 and the object 504 in the real frame N−2 may be, for example, calculated based on the coordinates of the object 504 in the real frame N−2 and coordinates of the object 504 in the real frame N−4.

In an embodiment of this application, the calculating a third motion vector based on the first motion vector and the second motion vector includes:

using half of a difference between the second motion vector and the first motion vector as the third motion vector, where the third motion vector may, for example, include half of a difference between the first motion component between the object 502 in the real frame N−4 and the object 502 in the real frame N−2 and the first motion component between the object 502 in the real frame N−2 and the object 502 in the real frame N, and the third motion vector may further include half of a difference between the second motion component between the object 504 in the real frame N−4 and the object 504 in the real frame N−2 and the second motion component between the object 504 in the real frame N−2 and the object 504 in the real frame N.

In an embodiment of this application, the obtaining a first prediction image frame based on the first motion vector, the third motion vector, and the one or more first objects includes:

obtaining prediction coordinates of the fifth object based on a sum of half of the first motion component of the first motion vector, a first motion component of the third motion vector, and the coordinates of the fifth object, and obtaining prediction coordinates of the eighth object based on a sum of half of the second motion component of the first motion vector, a second motion component of the third motion vector, and the coordinates of the eighth object; and obtaining the first prediction image frame based on the prediction coordinates of the fifth object and the prediction coordinates of the eighth object.

In an embodiment of this application, the method further includes:

discarding a drawing instruction stream of an image frame between the first image frame and the second image frame; and discarding a drawing instruction stream of an image frame between the second image frame and the third image frame.

In an embodiment of this application, the method further includes:

drawing the drawing instruction stream of the first image frame.

In an embodiment of this application, the method further includes:

displaying the second prediction image frame after the first image frame is displayed.

According to a second aspect, this application provides an image prediction method, applied to an electronic device. The electronic device includes an identification module 316, a match module 322, a calculation module 324, an estimation module 326, and a combination module 330, and the method includes:

The identification module 316 obtains a drawing instruction stream of a first image frame.

The identification module 316 obtains one or more first objects in the first image frame according to a first-type drawing instruction in the drawing instruction stream of the first image frame, where the first-type drawing instruction is a scenario drawing instruction.

The identification module 316 obtains one or more second objects in the first image frame according to a second-type drawing instruction in the drawing instruction stream of the first image frame, where the second-type drawing instruction is a control drawing instruction.

The match module 322 obtains one or more third objects in a second image frame.

The calculation module 324 calculates a first motion vector between the one or more first objects and the one or more third objects, where the one or more third objects match the one or more first objects, and the second image frame is an image frame before the first image frame.

The calculation module 324 obtains a second motion vector, where the second motion vector is a motion vector between the one or more third objects and one or more fourth objects in a third image frame, the one or more third objects match the one or more fourth objects, and the third image frame is an image frame before the second image frame.

The calculation module 324 calculates a third motion vector based on the first motion vector and the second motion vector.

The estimation module 326 obtains a first prediction image frame based on the first motion vector, the third motion vector, and the one or more first objects.

The combination module 330 combines the first prediction image frame with the one or more second objects, to obtain a second prediction image frame.

In an embodiment of this application, the electronic device further includes an interception module 314, and before the identification module 316 obtains the drawing instruction stream of the first image frame, the interception module 314 replaces a first pointer in a pointer list with a second pointer, where the first pointer points to a first function, the second pointer points to a second function, the first function is used to draw the first image frame, and the second function is used by the identification module to identify a drawing instruction in the drawing instruction stream of the first image frame.

In an embodiment of this application, before the identification module 316 obtains the one or more first objects in the first image frame according to the first-type drawing instruction in the drawing instruction stream, the identification module identifies the drawing instruction in the drawing instruction stream of the first image frame based on the second function, to determine the first-type drawing instruction, the second-type drawing instruction, and a third-type drawing instruction in the drawing instruction stream of the first image frame.

In an embodiment of this application, before the match module 322 obtains the one or more third objects in the second image frame, the identification module further obtains a drawing instruction stream of the second image frame, and obtains the one or more third objects in the second image frame according to a first-type drawing instruction in the drawing instruction stream of the second image frame; and the identification module stores the one or more third objects in a cache of the electronic device.

In an embodiment of this application, the electronic device further includes a separation module 318, the one or more first objects include a fifth object and an eighth object, the one or more third objects include a sixth object and a ninth object, an identifier of the fifth object is the same as an identifier of the sixth object, an identifier of the eighth object is the same as an identifier of the ninth object, and after the identification module obtains the one or more first objects in the first image frame, the separation module obtains vertex information of the sixth object based on the identifier of the fifth object; the separation module determines, based on that vertex information of the fifth object is different from the vertex information of the sixth object, that the fifth object is a dynamic object; the separation module obtains vertex information of the ninth object based on the identifier of the eighth object; the separation module determines, based on that vertex information of the eighth object is the same as the vertex information of the ninth object, that the eighth object is a static object; and the separation module records the fifth object as the dynamic object, and records the eighth object as the static object.

In an embodiment of this application, that the calculation module 324 calculates a first motion vector between the one or more first objects and the one or more third objects includes: the calculation module 324 calculates a first motion component of the first motion vector based on coordinates of the fifth object and coordinates of the sixth object; and the calculation module calculates a second motion component of the first motion vector based on coordinates of the eighth object and coordinates of the ninth object.

In an embodiment of this application, before the calculation module 324 obtains the second motion vector, the method includes:

the calculation module obtains a drawing instruction stream of the third image frame;

the calculation module obtains the one or more fourth objects in the third image frame according to a first-type drawing instruction in the drawing instruction stream of the third image frame;

the calculation module stores the one or more fourth objects in the cache of the electronic device; and after the calculation module obtains the one or more third objects in the second image frame, the method further includes:

the calculation module calculates the second motion vector between the one or more third objects and the one or more fourth objects; and the calculation module stores the second motion vector in the cache of the electronic device.

In an embodiment of this application, the one or more fourth objects include a seventh object and a tenth object, the identifier of the sixth object is the same as an identifier of the seventh object, the identifier of the ninth object is the same as an identifier of the tenth object, and that the calculation module calculates the second motion vector between the one or more third objects and the one or more fourth objects includes:

the calculation module calculates a first motion component of the second motion vector based on the coordinates of the sixth object and coordinates of the seventh object; and the calculation module calculates a second motion component of the second motion vector based on the coordinates of the ninth object and coordinates of the tenth object.

In an embodiment of this application, that the calculation module calculates a third motion vector based on the first motion vector and the second motion vector includes:

the calculation module uses half of a difference between the second motion vector and the first motion vector as the third motion vector.

In an embodiment of this application, that the estimation module 326 obtains a first prediction image frame based on the first motion vector, the third motion vector, and the one or more first objects includes:

the estimation module obtains prediction coordinates of the fifth object based on a sum of half of the first motion component of the first motion vector, a first motion component of the third motion vector, and the coordinates of the fifth object;

the estimation module obtains prediction coordinates of the eighth object based on a sum of half of the second motion component of the first motion vector, a second motion component of the third motion vector, and the coordinates of the eighth object; and the estimation module obtains the first prediction image frame based on the prediction coordinates of the fifth object and the prediction coordinates of the eighth object.

In an embodiment of this application, the electronic device further includes a discarding module, the discarding module discards a drawing instruction stream of an image frame between the first image frame and the second image frame, and the discarding module further discards a drawing instruction stream of an image frame between the second image frame and the third image frame.

In an embodiment of this application, the electronic device further includes a display module 332, and the display module displays the second prediction image frame after the first image frame is displayed.

According to a third aspect, this application provides an electronic device, including a processor and a storage device. The storage device stores program instructions, and when the program instructions are run by the processor, the electronic device is enabled to perform the prediction method in the first aspect.

According to a fourth aspect, this application provides an electronic device, including a processor and a storage device. The storage device stores program instructions, and when the program instructions are run by the processor, the electronic device is enabled to perform the prediction method in the second aspect.

According to a fifth aspect, this application provides a computer-readable storage medium, including computer instructions. When the computer instructions are run on an electronic device, the electronic device is enabled to perform the prediction method in the first aspect.

According to a sixth aspect, this application provides a computer-readable storage medium, including computer instructions. When the computer instructions are run on an electronic device, the electronic device is enabled to perform the prediction method in the second aspect.

According to the prediction method described in this application, fewer resources can be consumed by a GPU and a GPU to execute a drawing instruction, and therefore load of the electronic device is reduced.

BRIEF DESCRIPTION OF DRAWINGS

FIG. 7 is a flowchart of an image frame prediction method according to an embodiment of the present disclosure;

DESCRIPTION OF EMBODIMENTS

The following describes technical solutions in embodiments of this application with reference to accompanying drawings in embodiments of this application. In the descriptions of embodiments of this application, unless otherwise specified, "I" represents "or". For example, A/B may represent A or B. In this specification, "and/or" is merely an association relationship for describing associated objects, and indicates that three relationships may exist. For example, A and/or B may indicate the following three cases: Only A exists, both A and B exist, and only B exists.

In the following, terms such as "first" and "second" are merely used for a description purpose, and are not understood as indicating or implying relative importance or implicitly indicating a quantity of indicated technical features. Therefore, features defined by "first" and "second" may explicitly or implicitly include one or more of the features. In the descriptions of embodiments of this application, unless otherwise specified, "a plurality of" means two or more.

Figure 1:
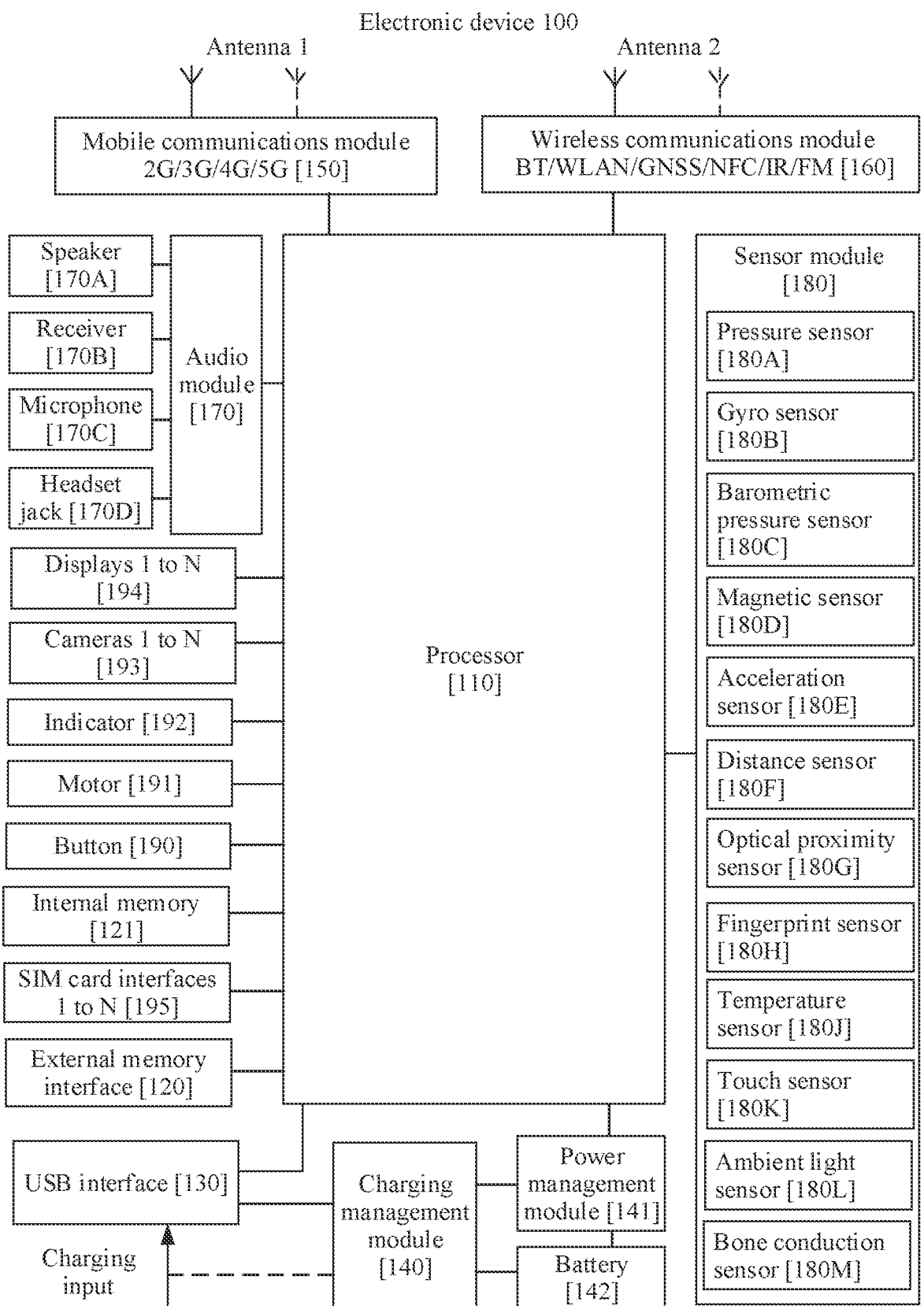
FIG. 1 is a schematic diagram of a structure of an electronic device 100 according to an embodiment of the present disclosure.

FIG. 1 is specifically a schematic diagram of a structure of an electronic device 100. A method provided in this application may be applied to the electronic device 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module

160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of the present disclosure does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or used cyclically by the processor 110. If the processor 110 needs to use the instructions or the data again, the processor 110 may directly invoke the instructions or the data from the memory, to avoid repeated access, and reduce a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, thereby implementing a touch function of the electronic device 100.

The I2S interface may be configured to perform audio communication. In some embodiments, the processor 110 may include a plurality of groups of I2C buses. The processor 110 may be coupled to the audio module 170 by using the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and encode an analog signal. In some embodiments, the audio module 170 may be coupled to the wireless communications module 160 through the PCM bus interface. In some embodiments, the audio module 170 may also transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through UART interface, to implement a function of playing music by using a Bluetooth headset.

The MIPI interface may be configured to connect the processor 110 to a peripheral component such as the display 194 and the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may also be configured as the I2C interface, the I2S interface, the UART interface, the MIPI interface, or the like.

The USB interface 130 is an interface that conforms to a USB standard specification, and may be specifically a mini USB interface, a micro USB interface, a USB type-C interface, or the like. The USB interface 130 may be configured to connect to the charger to charge the electronic device 100, or may be configured to transmit data between the electronic device 100 and a peripheral device, or may be configured to connect to a headset and play audio by using the headset. The interface may be further configured to connect to another electronic device such as an AR device.

It may be understood that an interface connection relationship between the modules that is shown in embodiments of the present disclosure is merely an example for description, and does not constitute a limitation on a structure of the electronic device 100. In some other embodiments, the electronic device 100 may alternatively use an interface connection manner different from that in the foregoing embodiment, or a combination of a plurality of interface connection manners.

The charging management module 140 is configured to receive a charging input from the charger. The charger may be a wireless charger, or may be a wired charger. In some embodiments of wired charging, the charging management module 140 may receive a charging input of the wired charger through the USB interface 130. In some embodiments of wireless charging, the charging management module 140 may receive a wireless charging input by using a wireless charging coil of the electronic device 100. The charging management module 140 may further supply power to the electronic device through the power management module 141 while charging the battery 142.

The power management module 141 is configured to connect the battery 142 and the charging management module 140 to the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may further monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a solution, applied to the electronic device 100, to wireless communication including 2G/3G/4G/5G and the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and send a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (WLAN) (such as a wireless fidelity (Wi-Fi) network), Bluetooth (BT), global navigation satellite system (GNSS), frequency modulation (FM), near field communication (NFC), an infrared (IR) technology, and the like. The wireless communications module 160 may be one or more components integrating at least one communications processor module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 is coupled to the mobile communications module 150, and the antenna 2 is coupled to the wireless communications module 160, so that the electronic device 100 can communicate with a network and other devices by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function through the GPU, the display 194, the application processor, and the like. The GPU is a microprocessor for image processing, and is connected to the display 194 and the application processor. The GPU is configured to perform mathematical and geometric calculation and perform graphics rendering. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), Miniled, MicroLed, Micro-oLed, a quantum dot light emitting diode (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a still image or a video. An object generates an optical image through the lens and projects the optical image to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal. In addition to a digital image signal, the digital signal processor may also process another digital signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 may play or record videos in a plurality of encoding formats, for example, moving picture experts group (MPEG)1, MPEG2, MPEG3, and MPEG-4.

NPU is a neural-network (NN) computing processor. By using a biological neural-network structure, for example, by using a transfer mode between human brain neurons, input information is rapidly processed, and self-learning may be performed continuously. Applications such as intelligent cognition of the electronic device 100 may be implemented by using the NPU, for example, image recognition, facial recognition, speech recognition, and text understanding.

The external memory interface 120 may be configured to connect to an external storage card, such as a micro SD card, to extend a storage capability of the electronic device 100. The external storage card communicates with the processor 110 through the external memory interface 120, to implement a data storage function. For example, a file such as music or video is stored in an external memory card.

The internal memory 121 may be configured to store computer executable program code, where the executable program code includes instructions. The internal memory 121 may include a program storage area and a data storage area. The program storage area may store an operating system, an application required by at least one function (for example, a sound play function or an image play function), and the like. The storage data area may store data (such as audio data or a phone book) created in a use process of the electronic device 100. In addition, the internal memory 121 may include a high-speed random access memory, and may further include a non-volatile memory, such as at least one disk storage device, a flash memory, or a universal flash storage (UFS). The processor 110 executes various function applications and data processing of the electronic device 100 by running instructions stored in the internal memory 121 and/or instructions stored in the memory disposed in the processor.

The electronic device 100 may implement an audio function such as music play or recording through the audio module 170, the speaker 170A, the receiver 170B, the microphone 170C, the headset jack 170D, an application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some function modules of the audio module 170 may be disposed in the processor 110.

The speaker 170A, also referred to as a "horn", is configured to convert an audio electrical signal into a sound signal. The electronic device 100 may be used to listen to music or answer a call in a hands-free mode through the speaker 170A.

The receiver 170B, also referred to as an "earpiece", is configured to convert an audio electrical signal into a sound signal. When the electronic device 100 is used to answer a call or listen to voice information, the receiver 170B may be put close to a human ear to listen to a voice.

The microphone 170C, also referred to as a "mike" or a "microphone", is configured to convert a sound signal into an electrical signal. When making a call or sending a voice message, the user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (OMTP) standard interface, or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages application icon, an instruction for viewing an SMS message is performed. When a touch operation whose touch operation intensity is greater than or equal to the first pressure threshold is performed on the Messages application icon, an instruction for creating a new SMS message is performed.

The gyro sensor 180B may be configured to determine a moving posture of the electronic device 100. In some embodiments, an angular velocity of the electronic device 100 around three axes (namely, axes x, y, and z) may be determined through the gyro sensor 180B. The gyro sensor 180B may be configured to implement image stabilization during photographing. For example, when the shutter is pressed, the gyro sensor 180B detects an angle at which the electronic device 100 jitters, and calculates, based on the angle, a distance for which a lens module needs to be compensated, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude by using the barometric pressure measured by the barometric pressure sensor 180C, to assist in positioning and navigation.

The magnetic sensor 180D includes a Hall sensor. The electronic device 100 may detect opening and closing of a flip cover through the magnetic sensor 180D. In some embodiments, when the electronic device 100 is a clamshell phone, the electronic device 100 may detect opening and closing of a flip over based on the magnetic sensor 180D. Further, a feature such as automatic unlocking upon opening of the flip cover is set based on a detected opening or closing state of the flip cover.

The acceleration sensor 180E may detect magnitude of acceleration in various directions (generally on three axes) of the electronic device 100, and may detect magnitude and a direction of the gravity when the electronic device 100 is still. The acceleration sensor 180E may be further configured to identify a posture of the electronic device, and is applied to an application such as switching between landscape mode and portrait mode or a pedometer.

The distance sensor 180F is configured to measure a distance. The electronic device 100 may measure the distance in an infrared or a laser manner. In some embodiments, in a photographing scenario, the electronic device 100 may measure a distance through the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, through the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is lower than another threshold, the electronic device 100 heats the battery 142 to prevent the electronic device 100 from being shut down abnormally because of a low temperature. In some other embodiments, when the temperature is lower than still another threshold, the electronic device 100 boosts an output voltage of the battery 142 to avoid abnormal shutdown caused by a low temperature.

The touch sensor 180K may also be referred to as a "touch component". The touch sensor 180K may be disposed on the display 194, and the touch sensor 180K and the display 194 form a touchscreen, which is also referred to as a "touchscreen". The touch sensor 180K is configured to detect a touch operation on or near the touch sensor 180K. The touch sensor may transfer the detected touch operation to the application processor to determine a touch event type. A visual output related to the touch operation may be provided by the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a human pulse to receive a blood pressure beating signal. In some embodiments, the bone conduction sensor 180M may alternatively be disposed in the headset, to obtain a bone conduction headset. The audio module 170 may parse out a speech signal through parsing based on the vibration signal that is of the vibration bone of the human vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio play) may correspond to different vibration feedback effects. The motor 191 may also correspond to different vibration feedback effects for touch operations on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may be further compatible with an external storage card. The electronic device 100 interacts with a network by using the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

The following explains and describes a principle of an image frame prediction method shown in this application with reference to the accompanying drawings.

For ease of understanding, the following describes some professional technical terms in the solutions of this application:

Graphics Library

The graphics library is also referred to as a drawing library. The graphics library is configured to define an application programming interface (API) across programming languages and platforms. The graphics library includes many functions for processing graphics. An open graphics library (OpenGL) is used as an example. An API defined by the OpenGL includes an interface for drawing a two-dimensional image or a three-dimensional image (the interface includes a drawing function, for example, a drawing function glDrawElements ( )), and further includes an interface for presenting an image drawn based on the drawing function to a display interface (the interface includes a rendering function, for example, a function eglSwapBuffers ( )). No enumeration is provided in embodiments of this application. A function in the OpenGL may be invoked according to an instruction, for example, a drawing function may be invoked according to a drawing instruction, to draw a two-dimensional image or a three-dimensional image. The drawing instruction is a command compiled by a developer based on a function in a graphics library during development of a game application, and is used to invoke an interface of a graphics library corresponding to the drawing instruction.

Game Image Frame

As described above, the two-dimensional image or the three-dimensional image drawn by invoking the drawing function according to the drawing instruction may include a game image frame, and further includes an image frame of another type. Specifically, in a running process of a game application, continuous rendering and quick play are performed on a frame of image for display. An image frame is a frame of static image displayed by the game application. Each frame of static image may include a scenario image, a UI image, and the like. For example, the scenario image may include a scenery, a game character, a background object, a special effect, and a skill in a game. The UI image may include an image such as a rendering control button, a small map, and a floating text. In some games, a blood bar of a character is also included in the UI image. It should be noted that both the game character or the like in the scenario image and the rendering control button in the UI image may be considered as objects in the game image frame. It may be understood that each game image frame includes one object.

Drawing Instruction

Each object in the game image frame is obtained by executing a drawing instruction by using specific software or hardware of an electronic device. One object may be obtained by drawing one or more drawing instructions. Generally, objects are in a one-to-one correspondence with drawing instructions. It should be noted that each drawing instruction further includes a specific parameter carried in the drawing instruction, such as vertex information. When executing the drawing instruction, the electronic device draws, based on the specific parameter of the drawing instruction, an object corresponding to the drawing instruction. It should be noted that drawing instructions corresponding to a same object in different frames are consistent. For example, a big tree displayed in a plurality of consecutive game image frames in a game picture is drawn by the hardware of the electronic device according to a same drawing instruction. However, "same" does not mean no difference in this application. In some embodiments, "same" may be "approximate" or "similar".

Drawing Instruction Stream

The drawing instruction stream is an instruction stream including one or more drawing instructions, and one drawing instruction stream is generally used to draw one frame of image. Specifically, a GPU may invoke one or more interfaces of a graphics library by running one or more drawing instructions in the drawing instruction stream, to draw one or more objects in an image frame. It should be noted that each object drawn according to the drawing instruction may be represented by data stored in a memory. For example, a set of drawing objects generated according to the drawing instruction stream may constitute display data corresponding to a game image frame.

Figure 2:
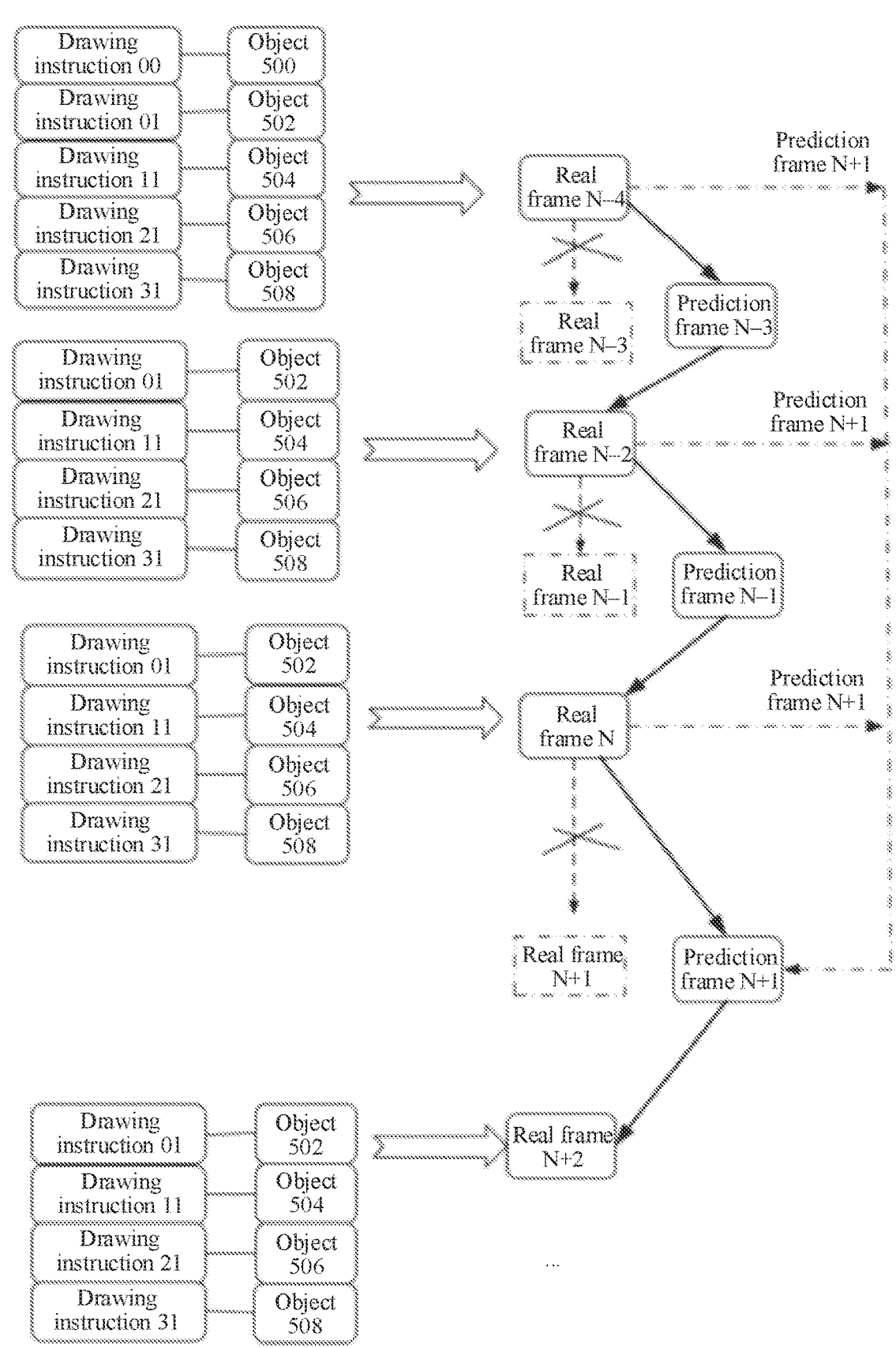
FIG. 2 is a schematic diagram of an image frame prediction method according to an embodiment of the present disclosure.

FIG. 2 specifically relates to a schematic diagram of an image frame prediction method in this application.

As shown in FIG. 2, a real frame N−4, a real frame N−3, a real frame N−2, a real frame N−1, a real frame N, a real frame N+1, and a real frame N+2 are image frames that are displayed in chronological order in a game application. The real frame is relative to a prediction frame, and the prediction frame may be obtained through prediction based on the real frame. Specifically, each real frame includes one or more objects, and the object in each real frame may be obtained by executing, by a GPU, a drawing instruction corresponding to the object in a drawing instruction stream. For example, the real frame N includes four objects: an object 502, an object 504, an object 506, and an object 508. The object 502, the object 504, the object 506, and the object 508 may be respectively drawn according to a drawing instruction 01, a drawing instruction 11, a drawing instruction 21, and a drawing instruction 31. The real frame N−2 includes four objects: an object 502, an object 504, an object 506, and an object 508. The object 502, the object 504, the object 506, and the object 508 are also respectively drawn according to a drawing instruction 01, a drawing instruction 11, a drawing instruction 21, and a drawing instruction 31.

The real frame N−4, the real frame N−3, the real frame N−2, the real frame N−1, the real frame N, the real frame N+1, and the real frame N+2 are consecutive image frames in the game application. Therefore, at a specific frame rate such as 60 fps, an image frame of 60 fps in the game application may be displayed in one second. It may be understood that one or more adjacent frames generally include a same object. For example, the real frame N−2 and the real frame N include four same objects (the object 502, the object 504, the object 506, and the object 508). Because a same object is generally drawn according to a same drawing instruction, a motion track of an object between adjacent frames is traceable and predictable. Specifically, in this application, a drawing instruction in a drawing instruction stream of each image frame is identified, and objects in the image frame are classified and marked, so as to predict motion tracks of one or more objects between adjacent frames to form a prediction frame. The prediction frame is obtained through prediction, so that fewer resources can be consumed by the GPU and the GPU to execute a drawing instruction, and therefore load of an electronic device can be reduced.

Still, as shown in FIG. 2, in a process in which the electronic device 100 displays the image frame of the game application, the drawing instruction stream corresponding to the real frames such as the real frame N−3, the real frame N−1, and the real frame N+1 may be discarded first. It should be noted that discarding the drawing instruction stream may be understood as skipping executing the drawing instruction stream. The drawing instruction stream corresponding to the real frame N−3, the real frame N−1, and the real frame N+1 is discarded, and therefore is not processed. Therefore, fewer resources can be consumed by the GPU to execute a drawing instruction, and therefore load of an electronic device can be reduced. It should be noted that, in embodiments of this application, one real frame is not limited to being discarded at an interval of one frame, but a drawing instruction stream of the real frame may be discarded in more manners. This is not limited in this application.

Still, as shown in FIG. 2, the electronic device 100 may predict a location of an object in the real frame N+1 based on a motion track of a same object included in the real frame N−4, the real frame N−2, and the real frame N, so as to form a prediction frame N+1. The prediction frame is displayed after the real frame N. In an embodiment, a quantity of prediction frames may be consistent with a quantity of discarded frames. In this way, a display frame rate of a game image frame can be ensured on the premise of reducing load of the electronic device. As shown in FIG. 2, after the real frame N−3, the real frame N−1, and the real frame N+1 are discarded, the electronic device 100 separately generates corresponding prediction frames at locations of the discarded real frames. It may be understood that, in the embodiment shown in FIG. 2, a sequence of displaying a frame stream of the electronic device is successively displaying the real frame N−4, the prediction frame N−3, the real frame N−2, the prediction frame N−1, the real frame N, the prediction frame N+1, and the real frame N+2.

It should be noted that the image frame prediction method shown in this application is not the same as a conventional video frame prediction method. This application is mainly applied to display of a game image frame, and the game image frame is different from a conventional video frame. Specifically, the game image frame has a high requirement on real-time performance. Therefore, only a previous frame can be used to predict a next frame, and a frame cannot be inserted between the previous frame and the next frame. However, a video picture does not have a high requirement on real-time performance. Therefore, a previous frame and a next frame can be used to predict an intermediate frame, and the intermediate frame can be inserted between the previous frame and the next frame. In addition, the video frame is obtained through calculation based on pixel data in the video frame. The game image frame is obtained through calculation based on a game rendering instruction and a parameter corresponding to the rendering instruction, and the parameter corresponding to the rendering instruction may include vertex information and the like. However, the video frame does not include vertex information.

Figure 3:
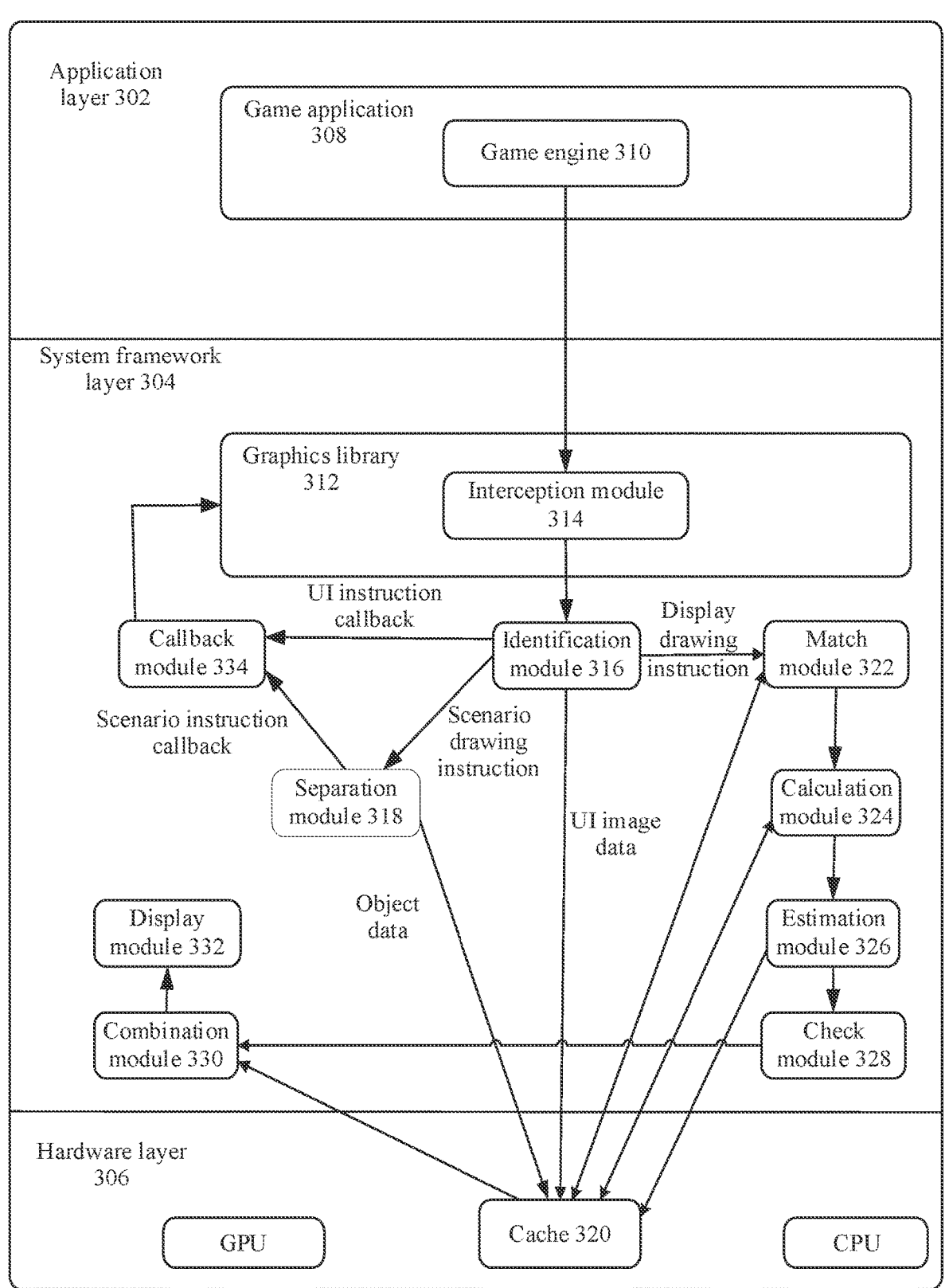
FIG. 3 shows a hardware layer and a software layer at which an image frame prediction method is performed according to an embodiment of the present disclosure.
Figure 5A:
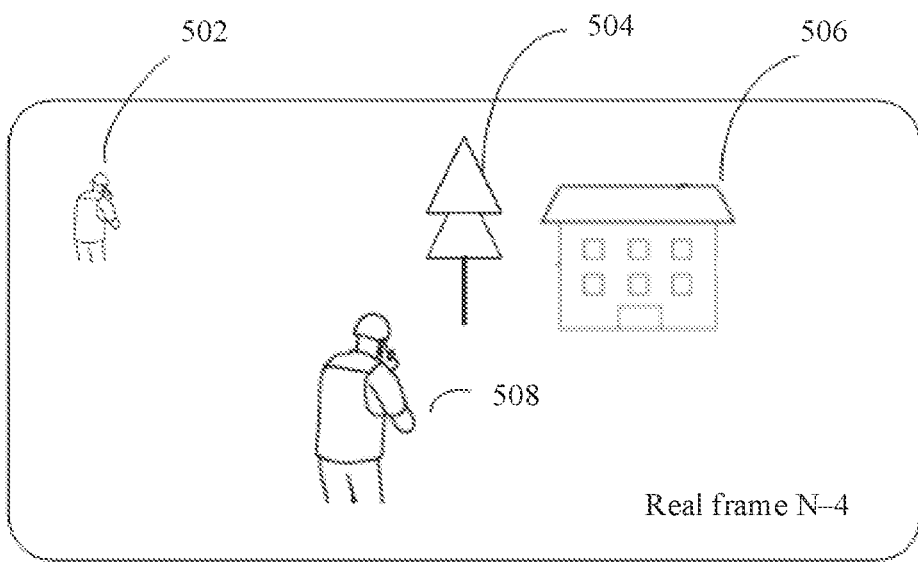
FIG. 5A to FIG. 5D are a schematic diagram of obtaining a motion vector graph between adjacent frames according to an embodiment of the present disclosure.
Figure 5B:
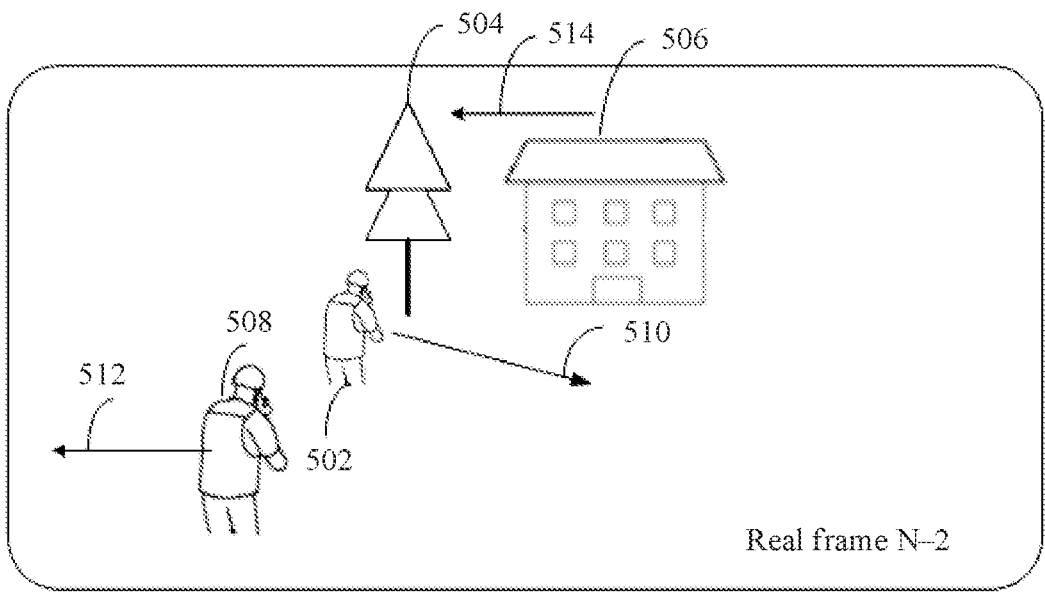
Figure 5C:
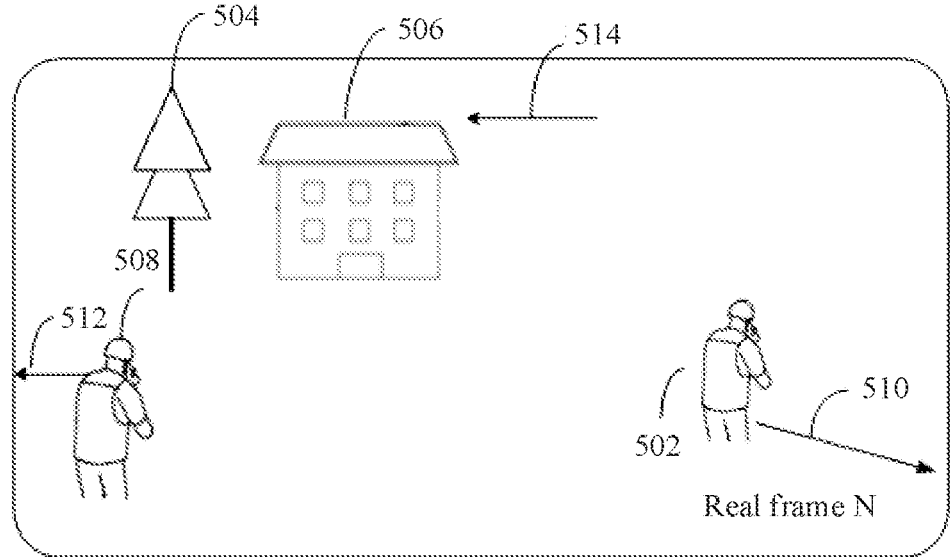
Figure 5D:
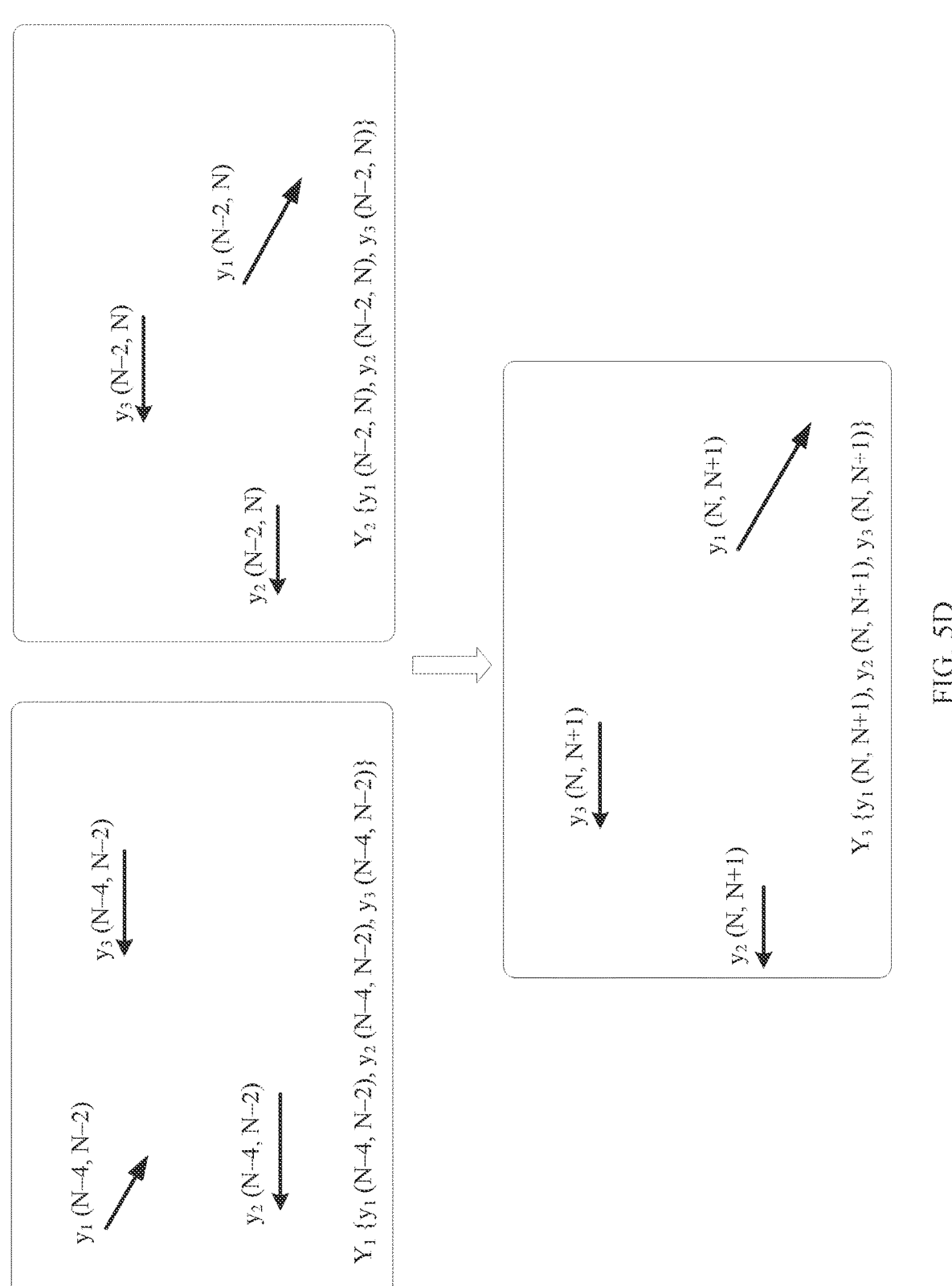

FIG. 3 is specifically a framework diagram of a software layer and a hardware layer of an image frame prediction method performed by the electronic device 100 according to an embodiment of this application. The following further explains and describes the method shown in this application with reference to FIG. 2, FIG. 3, and FIG. 5A to FIG. 5D. FIG. 5A is a schematic diagram of a scenario image of a real frame N−4 according to an embodiment of this application. FIG. 5B is a schematic diagram of a scenario image of a real frame N−2 according to an embodiment of this application. FIG. 5C is a schematic diagram of a scenario image of a real frame N according to an embodiment of this application. FIG. 5D shows a motion vector graph between objects in a real frame N−4, a real frame N−2, and a real frame N according to an embodiment of this application.

As shown in FIG. 3, a software layer of the electronic device 100 includes an application layer 302 and a system framework layer 304, and a hardware layer 306 includes a GPU, a CPU, a cache 320, and the like.

The application layer 302 includes one or more applications that may run on the electronic device 100, such as a game application 308. For ease of understanding, the following uses the game application 308 as an example to explain and describe the method shown in this application.

The game application 308 includes a game engine 310. The game engine 310 may invoke a drawing function in a graphics library 312 through a graphics library interface, to draw an image of the game application.

The system framework layer 304 may include various graphics libraries 312, such as an open graphics library for embedded system (OpenGL ES) and an EGL.

In a related technology, when a user enables the game application 308, the electronic device 100 starts the game application 308 in response to the operation that the user enables the game. The game engine 310 invokes a drawing function in a graphics library through a graphics library interface based on a drawing instruction stream of an image frame delivered by the game application, to draw the image frame. After generating image data of the image frame, the graphics library invokes a display interface (such as eglSwapBuffers ( )) to send the image data to a surfacefinger cache queue. The graphics library sends the image data in the cache queue to hardware (such as a CPU) for synthesis based on a periodic signal used for display, and finally sends the synthesized image data to a display of the electronic device 100 for display.

In an embodiment of this application, the graphics library 312 includes an interception module 314, and the graphics library 312 allows for modification of a function pointer list in the graphics library. The interception module 314 replaces a pointer in the function pointer list in the graphics library, so that the replaced function pointer points to a function in an identification module 316 outside the graphics library. In this way, the game engine delivers the drawing instruction stream of the image frame by using the game application, and when a function in the graphics library is invoked, the game engine first sends the drawing instruction stream to the identification module 316 to perform instruction identification. That is, the interception module 314 may intercept the drawing instruction stream of the image frame by replacing the pointer in the pointer list of the function in the graph library.

In an embodiment of this application, the currently intercepted drawing instruction stream of the interception module 314 is a drawing instruction stream of a real frame N. The identification module 316 may perform instruction identification on each drawing instruction in the drawing instruction stream of the real frame N delivered by the game application.

The drawing instruction stream generally includes three drawing instructions, such as a scenario drawing instruction, a UI drawing instruction, and an image display instruction. The scenario drawing instruction is used to draw an image such as a scenery, a character, a special effect, and a skill in a game, and the UI drawing instruction is used to draw an image such as a control button, a small map, and a floating text. In some games, a blood bar of a character is also drawn by using the UI drawing instruction. It should be noted that the UI drawing instruction may also be referred to as a control drawing instruction. The image display instruction is used to place drawn image data in a specified location in a system (for example, framebuffer0 in an Android system), so as to complete actual display.

The image display instruction in the drawing instruction stream is generally the last instruction in the drawing instruction stream of the image frame. The identification module 316 may determine whether a drawing instruction is used to invoke a display interface, to determine whether the drawing instruction is an image display instruction. For example, if the identification module 316 determines that a drawing instruction is used to invoke a swapbuffer interface, the identification module 316 determines that the drawing instruction is an image display instruction.

A UI image is generally located at an uppermost layer of an image frame. For example, an operation wheel, a button, and a small map border in the UI image are semi-transparent. When drawing the UI image, the graphics library needs to ensure that the drawn UI image is at an uppermost layer of the entire picture. Specifically, the game application may be implemented in a plurality of manners, so that the UI image is located at the uppermost layer of the image frame. In a manner, the game application may disable a depth test function and enable a blend test function, so that the UI image is located at the uppermost layer of the image frame. Therefore, the identification module 316 may detect whether the depth test function is disabled and the blend test function is enabled, to determine whether the identified drawing instruction is a UI drawing instruction. Specifically, when the identification module 316 identifies that the drawing instruction stream includes a blend test enabling command and a depth test disabling command, the identification module 316 may determine that all instructions subsequently intercepted by the interception module 314 are UI drawing instructions until an image display instruction is received. For example, the blend test enabling command may be glEnable (GL_BLEND), and the depth test disabling command may be glDisable (GL_DEPTH_TEST). In some games, in addition to disabling the depth test function and enabling the blend test function, another manner may be used to ensure that the UI image is located at the uppermost layer of the image frame. For example, the game application may assign a maximum value to a depth value of an object in the UI image, so that the UI image is located at the uppermost layer of the image frame. Therefore, after identifying an instruction used to set the depth value of the object to the maximum value and a blend test enabling command, the identification module 316 may determine that all instructions subsequently intercepted by the interception module 314 are UI drawing instructions until an image display instruction is received. Specifically, a sequence of the instruction used to set the depth value of the object to the maximum value and the blend test enabling command is not limited.

When the identification module 316 identifies the drawing instruction as a UI drawing instruction, UI image data drawn by using the UI drawing instruction is stored in the cache 320, so that the UI image data is combined with a predicted scenario image. For details, refer to the following description.

In an embodiment, a drawing instruction other than the UI drawing instruction and the image display instruction in the drawing instruction stream may be considered as a scenario drawing instruction. Specifically, a drawing instruction stream of an image frame is generally delivered in a sequence of a scenario drawing instruction, a UI drawing instruction, and an image display instruction. The identification module may consider both the blend test enabling command and a drawing instruction before the depth test disabling command as scenario drawing instructions. For example, there is a sequence between the blend test enabling command and the depth test disabling command. For example, the blend test enabling command is before the depth test disabling command. When the identification module 316 identifies the blend test enabling command, the identification module 316 records a mark 1 indicating that the blend test enabling command has been received. Subsequently, when the identification module identifies the depth test disabling command, the identification module 316 records a mark 2 indicating that the depth test command has been received. In this case, if the identification module determines that the mark 1 and the mark 2 have been recorded, it indicates that the identification module has received the blend test enabling command and the depth test disabling command. The identification module 316 may determine an instruction after the depth test disabling command as a UI drawing instruction, and a drawing instruction before the blend test enabling command as a scenario drawing instruction. Further, the identification module 316 may set a global variable with an initial value of 0. If the identification module determines that a value of the global variable is 0, the identification module 316 determines that the identified drawing instruction is a scenario drawing instruction. When a preset condition is met, the identification module sets the value of the global variable to 1. When the identification module subsequently determines that the value of the global variable is 1, the identification module 316 determines that the identified drawing instruction is a UI drawing instruction. Specifically, the identification module 306 may determine, based on the mark 1 and the mark 2, whether the foregoing preset condition is met. For example, when determining that the mark 1 and the mark 2 have been recorded, the identification module 316 may assign 1 to the global variable. In this way, when the identification module 314 sends a drawing instruction to the identification module according to a sequence of the scenario drawing instruction, the UI drawing instruction, and the image display instruction, the identification module 314 may identify the scenario drawing instruction and the UI drawing instruction based on the value of the global variable. It should be noted that, in the foregoing example, the identification module 314 is not limited to assigning a value to the global variable by detecting a mark indicating that the blend test enabling command and the depth test disabling command have been received, or may assign a value to the global variable by detecting a mark indicating that the blend test enabling command, the depth test disabling command, and a depth cache clearing command have been received.

The system framework layer 304 further includes a separation module 318, and the separation module 318 is configured to separate objects in a scenario image corresponding to the scenario drawing instruction. When the identification module 316 identifies the drawing instruction as a scenario drawing instruction, the identification module 316 may invoke the separation module 318, so that the separation module 318 separates a dynamic object from a static object in the scenario image corresponding to the scenario drawing instruction. The dynamic object is an object whose form, location, or size changes between adjacent frames, and the static object is an object whose form, location, or size does not change between adjacent frames.

The separation module 318 may separate the dynamic object from the static object based on a parameter carried in the scenario drawing instruction and an identifier of each object, and store the separated dynamic object and data of the dynamic object in the scenario image in the cache 320.

Each object drawn by using the drawing instruction includes a unique identifier used to represent the object. A parameter carried in the drawing instruction may include vertex information of the object, and a format of the vertex information may be as follows:

float vertices [ ]={0.5f, 0.5f, 0.0f,//upper right corner 0.5f, −0.5f, 0.0f,//lower right corner −0.5f, −0.5f, 0.0f,// lower left corner −0.5f, 0.5f, 0.0f//upper left corner}; vertex coordinates;

unsigned int indices[ ]={//the index starts from 0! 0, 1, 3,//the first triangle 1, 2, 3//the second triangle}; line of vertexes;

In an example, when the interception module 314 intercepts a scenario drawing instruction of the real frame N, the separation module 318 may obtain object data of the real frame N−2 from the cache 320 based on an identifier of an object in the real frame N, and determine whether the real frame N−2 also includes the object. Assuming that the real frame N−2 does not include the object, the separation module 318 may mark the object in the real frame N as a dynamic object. Further, if the real frame N−2 includes the object, the separation module 318 obtains vertex information of the object in the real frame N–2, and determines whether the vertex information of the object in the real frame N–2 is consistent with vertex information of the object in the real frame N. If the two pieces of information are inconsistent, the separation module 318 records the vertex information of the object in the real frame N, and marks the object as a dynamic object, or if the two pieces of information are consistent, marks the object as a static object. In an embodiment, flag bits for marking a dynamic object and a static object may be set in a stencil area of an object (a portion of an object data structure). For example, the static object is marked as 0, and the dynamic object is marked as 1. In this way, when separating an object in the real frame N, the separation module 318 may read the object data of the real frame N–2 from the cache 320. If the real frame N–2 includes the object, the separation module 318 may directly read stencil area data of the object in the real frame N–2, to determine whether the object is a static object or a dynamic object.

In an example, when an image frame intercepted by the interception module 314 is the first frame of the game application, each object in the first frame may be marked as a dynamic object.

For example, as shown in FIG. 5B and FIG. 5C, when separating an object 502 of the real frame N, the separation module 318 may directly obtain stencil area data of an object 502 in the real frame N–2 from the cache 320 based on an identifier of the object 502. If the stencil area data is 1, it is determined that the object 502 of the real frame N is a dynamic object, or if the stencil area data is 0, it is determined that the object 502 of the real frame N is a static object. Optionally, to ensure accuracy of a separation result, after determining, based on the stencil area data of the object 502 in the real frame N–2, that the object 502 is a static object or a dynamic object, the separation module 318 may further check whether the vertex information of the object 502 in the real frame N is consistent with the vertex information of the object 502 in the real frame N–2. If the two pieces of information are consistent, even though the stencil area data in the real frame N–2 is 1, the separation module also determines that the object 502 of the real frame N is a static object.

In an example, there may be a plurality of instructions related to an object, and generally, there is one instruction related to an object vertex. Because a drawing instruction is used to draw a corresponding object based on vertex information, the identification module 316 may send only a scenario drawing instruction that includes the vertex information to the separation module 318, so that the separation module 318 separates a dynamic object from a static object based on the vertex information carried in the scenario drawing instruction. In another example, the identification module 316 may call back a drawing instruction that does not include vertex information to the graphics library, so that the graphics library continues to invoke a related drawing function according to the drawing instruction that is called back, or the identification module 315 performs scenario identification based on the drawing instruction that does not carry the vertex information.

In an example, when the interception module 314 intercepts a drawing instruction stream of the real frame N, the cache 320 may store data of a dynamic object and data of a static object in a scenario image of the real frame N–2. It may be understood that the data of the dynamic object and the data of the static object in the scenario image of the real frame N–2 are separated by the separation module 318 when the electronic device 100 displays the real frame N–2, and are stored in the cache 320.

The system framework layer 304 further includes a match module 322. When the drawing instruction identified by the identification module 316 is an image display instruction of the real frame N, the identification module 316 invokes the match module 322, and the match module 322 obtains object data in a scenario image of the real frame N and data in a scenario image of the real frame N–2 from the cache 320, and matches objects between the real frame N and the real frame N–2. For example, the match module 322 may perform match based on an object identifier and/or object vertex information. Matching the objects between the real frame N and the real frame N–2 is matching a dynamic object in the real frame N against a dynamic object in the real frame N–2, and matching a static object in the real frame N against a static object in the real frame N–2. For example, as shown in FIG. 5B and FIG. 5C, if the object 502 of the 3,/real frame N is a dynamic object, the object 506 of the 3,/real frame N is a static object, the object 502 of the real frame N–2 is a dynamic object, and the object 506 of the real frame N–2 is a static object, the match module 322 may match the dynamic object 502 of the real frame N against the dynamic object 502 of the real frame N–2 based on identifiers of the object 502, and match the static object 506 of the real frame N against the static object 506 of the real frame N–2 based on identifiers of the object 506. In an example, the match module may send matched objects between the real frame N and the real frame N–2 to a calculation module 324. It may be understood that the matched objects between the real frame N and the real frame N–2 include matched dynamic objects and static objects. For example, the objects 502 may be matched dynamic objects between the real frame N and the real frame N–2, and the objects 506 may be matched static objects between the real frame N and the real frame N–2.

The calculation module 324 is configured to calculate a motion vector between matched objects in the real frame N and the real frame N–2, to obtain a motion vector graph $Y_2$ between the real frame N and the real frame N–2. The motion vector graph between the real frame N and the real frame N–2 may be considered as a set of motion vectors between matched objects in the real frame N and the real frame N–2. For example, the motion vector graph $Y_2$ may also be referred to as a first motion vector, and the first motion vector includes one or more motion components. A first motion component in the first motion vector may be a motion vector between the object 502 of the real frame N and the object 502 of the real frame N–2, and a second motion component in the first motion vector may be a motion vector between the object 506 of the real frame N and the object 506 of the real frame N–2.

The calculation module 324 is further configured to calculate a motion vector between matched objects in the real frame N–2 and the real frame N–4, to constitute a motion vector graph $Y_1$ between the real frame N–2 and the real frame N–4. Specifically, the motion vector between the matched objects in the real frame N–2 and the real frame N–4 and the motion vector graph $Y_1$ between the real frame N–2 and the real frame N–4 are obtained by the calculation module 324 through calculation when the electronic device 100 displays the real frame N–2. For example, the motion vector graph $Y_1$ may also be referred to as a second motion vector, and the second motion vector includes one or more motion components, such as a first motion component and a second motion component. The first motion component in the second motion vector may be a motion vector between the object 502 of the real frame N−2 and the object 502 of the real frame N−4, and the second motion component in the second motion vector may be a motion vector between the object 506 of the real frame N−2 and the object 506 of the real frame N−4.

For example, half of a difference between the first motion vector and the second motion vector is defined as a third motion vector. It may be understood that the third motion vector also includes a first motion component and a second motion component. For example, the first motion component of the third motion vector is half of a difference between the first motion component of the first motion vector and the first motion component of the second motion vector, and the second motion component of the third motion vector is half of a difference between the second motion component of the first motion vector and the second motion component of the second motion vector.

The calculation module 324 may store the motion vector graph $Y_1$ between the real frame N and the real frame N−2 in the cache 320. The calculation module 324 may further calculate an estimation motion vector graph $Y_3$ between the real frame N and the real frame N+1 based on the motion vector graph $Y_2$ between the real frame N and the real frame N−2 and the motion vector graph $Y_1$ between the real frame N−2 and the real frame N−4. The calculation module 324 may store the estimation motion vector graph $Y_3$ in the cache 320. In an example, after calculating the estimation motion vector graph $Y_3$, the calculation module 324 may send the estimation motion vector graph $Y_3$ to an estimation module 326 to perform motion estimation on an object in a scenario image of the real frame N.

As shown in FIG. 5A to FIG. 5D, the following further describes a method for calculating the estimation motion vector graph by the calculation module 324.

FIG. 5A to FIG. 5C all include the objects 502, 504, 506, and 508, FIG. 5A, FIG. 5B, and FIG. 5C correspond to the real frame N−4, the real frame N−2, and the real frame N, respectively. When the electronic device displays the real frame N−2, the separation module may obtain object data of the real frame N−4 from the cache 320, and read values of specific areas such as stencil areas of object data structures of the object 502, the object 508, the object 504, and the object 506, to determine that the object 502 and the object 508 are dynamic objects, and the object 504 and the object 506 are static images. When displaying the real frame N−2, the electronic device may determine that, from the real frame N−4 to the real frame N−2, the object 502 moves in a direction 510, the object 508 moves in a direction 512, and other static images in the scenario image move in a direction 514 as a whole. When displaying the real frame N, the electronic device may determine that, from the real frame N−2 to the real frame N, the object 502 moves in a direction 510, the object 508 moves in a direction 512, and other static images in the scenario image move in a direction 514 as a whole.

As shown in FIG. 5D, after the match module 322 matches the objects 502 and the objects 508 of the real frame N−4 and the real frame N−2, the calculation module 324 may calculate a motion vector $y_1$ (N−4, N−2) between the objects 502 of the real frame N−4 and the real frame N−2, and a motion vector $y_2$ (N−4, N−2) between the objects 508 of the real frame N−4 and the real frame N−2. Because a motion vector between matched static objects in the real frame N−4 and the real frame N−2 is equal to an entire scenario motion vector, the calculation module 324 may calculate a motion vector $y_3$ (N−4, N−2) between any matched static objects (for example, objects 504) of the real frame N−4 and the real frame N−2, to determine the motion vector $y_3$ (N−4, N−2) between the matched static objects in the real frame N−4 and the real frame N−2. A set $Y_1$ {$y_1$ (N−4, N−2), $y_2$ (N−4, N−2), $y_3$ (N−4, N−2)} of motion vectors that are between all matched objects in the real frame N−4 and the real frame N−2 and that are calculated by the calculation module 324 is a motion vector graph between the real frame N−4 and the real frame N−2. As shown in FIG. 5D, the motion vector graph $Y_1$ is the motion vector graph between the real frame N−4 and the real frame N−2.

Based on a same principle, after the match module matches the objects 502 and the objects 508 of the real frame N−2 and the real frame N, the calculation module 324 may calculate a motion vector $y_1$ (N−2, N) between the objects 502 of the real frame N−2 and the real frame N, and a motion vector $y_2$ (N−2, N) between the objects 508 of the real frame N−2 and the real frame N. The calculation module 324 may further calculate a motion vector $y_3$ (N−2, N) between any matched static objects (for example, objects 504) of the real frame N−2 and the real frame N, to determine the motion vector $y_3$ (N−2, N) between the static objects in the entire real frame N−2 and the real frame N. A set $Y_2$ {$y_1$ (N−2, N), $y_2$ (N−2, N), $y_3$ (N−2, N)} of motion vectors that are between all matched objects in the real frame N−2 and the real frame N and that are calculated by the calculation module 324 is a motion vector graph between the real frame N−2 and the real frame N. As shown in FIG. 5D, the motion vector graph $Y_2$ is the motion vector graph between the real frame N−2 and the real frame N.

The calculation module 324 may further calculate an estimation motion vector graph $Y_3$ between the real frame N and the real frame N+1 based on the motion vector graph $Y_1$ and the motion vector graph $Y_2$. For example, it is assumed that each object performs uniform acceleration motion. The calculation module 324 may calculate a motion acceleration of an object between the real frame N and the real frame N+1 by using the motion vector graph $Y_1$ and the motion vector graph $Y_2$, for example, an object 502 included in the real frame N−4, the real frame N−2, and the real frame N. In other words, the object 502 is an object matched between the real frame N−4 and the real frame N−2, and is also an object matched between the real frame N−2 and the real frame N. The calculation module 324 may calculate a motion vector $y_1$ (N, N+1) between objects 502 of the real frame N and the real frame N+1 by using the motion vector $y_1$ (N−4, N−2) between the objects 502 of the real frame N−4 and the real frame N−2, and the motion vector $y_1$ (N−2, N) between the objects 502 of the real frame N−2 and the real frame N. For example, $y_1$ (N−2, N+1)=$y_1$ (N−2, N)/2+($y_1$ (N−2, N)−$y_1$ (N−4, N−2))/2. Based on a same principle, the motion vector $y_2$ (N, N+1) between the objects 508 of the real frame N and the real frame N+1 may be calculated. For example, $y_2$ (N, N+1)=$y_2$ (N−2, N)/2+($y_2$ (N−2, N)−$y_2$ (N−4, N−2))/2. Based on a same principle, motion vectors $y_3$ (N, N+1) between all static objects in the real frame N and the real frame N+1 may be calculated, to constitute an estimation motion vector graph $Y_3$ {$y_1$ (N, N+1), $y_2$ (N, N+1), $y_3$ (N, N+1)} between the real frame N and the real frame N+1.

The system framework layer further includes an estimation module 326, and the estimation module 326 may perform motion estimation on an object in the real frame N by using the estimation motion vector graph $Y_3$ calculated by the calculation module 324, scenario image data of the real frame N, and the motion vector graph $Y_2$ between the real frame N and the real frame N−2.

For example, the estimation module 326 performs motion estimation on a motion track of the object 502 in the real frame N based on the estimation motion vector $y_1$ (N, N+1) of the object 502 in $Y_3$. Specifically, coordinates of the object 502 in the prediction frame N+1=coordinates of the object 502 in the real frame N+$y_1$ (N, N+1). Based on a same principle, the estimation module 326 performs motion estimation on a motion track of the object 508 based on the estimation motion vector $y_2$ (N, N+1) of the object 508 in $Y_3$ and the motion vector $y_2$ (N−2, N) of the object 508 in $Y_2$. Specifically, coordinates of the object 508 in the prediction frame N+1=coordinates of the object 508 in the real frame N+$y_2$ (N, N+1). Based on a same principle, locations of other objects in the real frame may also be estimated.

That is, the estimation module 326 performs shifting on each dynamic object and each static object by using coordinates of an object in the real frame N and a vector of the object in the estimation motion vector graph $Y_3$, to obtain a prediction scenario image of the prediction frame N+1. In an example, the estimation module 326 may store data of the prediction scenario image in the cache 320.

After obtaining the prediction scenario image of the prediction frame N+1, the estimation module 326 invokes a check module 328 in the system framework layer to check the prediction scenario image.

Some pixels or pixel blocks that do not appear in the real frame N, the real frame N−2, and the real frame N−4 may exist in the prediction scene image obtained by the estimation module. This is because objects in the scenario image are shielded from each other, a picture moves to display a new picture, and the like. Therefore, the prediction scenario image needs to be checked. Specifically, the scenario image may be checked by using a plurality of methods. For example, a size of a new pixel in the entire scenario image may be calculated. Then, the new pixel is compared with a preset check threshold, and if the threshold is exceeded, the prediction frame is discarded.

In an embodiment, for the prediction frame N+1 that succeeds in the check, fuzzy processing may be performed on the prediction scenario image.

After checking the prediction scenario image, the check module 328 invokes a combination module 330, and the combination module 330 is configured to combine the prediction scenario image with the UI image.

After checking the prediction scenario image, the check module 328 invokes the combination module 330 to combine the UI image with the prediction scenario image, to constitute a final prediction image frame N+1. Specifically, the combination module 330 may obtain prediction scenario image data and UI image data from the cache 320. A location of the UI image in the entire image frame is generally fixed. Therefore, the UI image may be combined into the prediction scenario image to form the final prediction image frame N+1. After the combination module obtains the final prediction image frame, the cache may clear unneeded data, for example, an invalid motion vector graph and object data of the real frame. For example, in the foregoing embodiment, after the prediction frame N+1 is obtained, the motion vector graph between the real frame N−4 and the real frame N−2 is no longer used to predict the real frame N+3, and the motion vector graph between the real frame N−4 and the real frame N−2 is an invalid motion vector graph. Similarly, the object data of the real frame N−4 in the cache is also invalid object data. To save the cache 320, the invalid motion vector graph and the object data of the invalid scenario image may be cleared.

Figure 6:
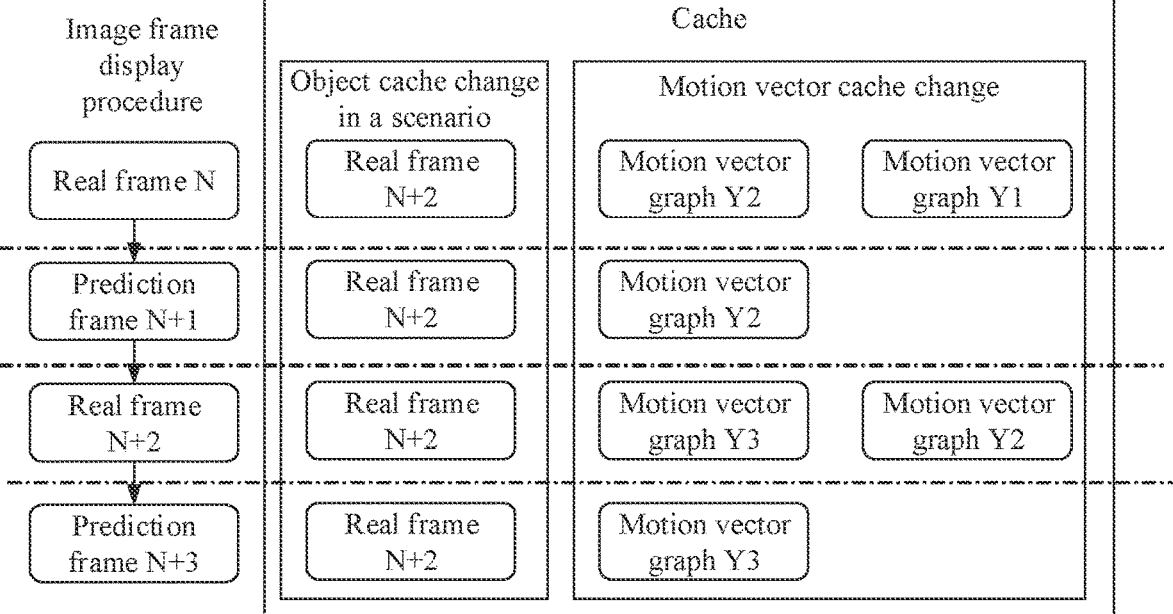
FIG. 6 is a schematic diagram of storage changes of an image frame and a motion vector graph in a cache according to an embodiment of the present disclosure.

The following describes changes of data stored in the cache 320 with reference to FIG. 2 to FIG. 6. FIG. 6 is a schematic diagram of changes of a motion vector graph and object data in a scenario image of a real frame that are stored in the cache 320 according to an embodiment of this application.

When the electronic device displays the real frame N, the cache 320 stores object data in a scenario image of the real frame N, and further stores a motion vector graph $Y_1$ between the real frame N−4 and the real frame N−2, and a motion vector graph $Y_2$ between the real frame N−2 and the real frame N. When the electronic device displays the prediction frame N+1, the motion vector graph $Y_1$ between the real frame N−4 and the real frame N−2 in the cache is cleared. When the electronic device displays the real frame N+2, data in a scenario image of the real frame N may be cleared after the motion vector graph between the real frame N and the real frame N+2 is obtained through calculation. In this case, the cache 320 stores object data in a scenario image of the real frame N+2, a motion vector graph $Y_2$ between the real frame N−2 and the real frame N, and a motion vector graph $Y_4$ between the real frame N and the real frame N+2. When the electronic device displays a prediction frame N+3, the motion vector diagram $Y_2$ between the real frame N−2 and the real frame N in the cache is cleared.

That is, when the electronic device 100 displays the real frame N, the cache stores the scenario image data of the real frame N, the motion vector graph between the real frame N−4 and the real frame N−2, and the motion vector graph between the real frame N−2 and the real frame N. When the prediction frame N+1 is displayed, the cache stores the scenario image data of the real frame N and the motion vector graph between the real frame N−2 and the real frame N. In this way, a storage area of a memory can be better saved.

The system framework layer further includes a display module 332, and the display module is configured to display the prediction image frame N+1 after the real frame N is displayed.

In an embodiment of this application, the system framework layer further includes a callback module 334. The callback module 334 is configured to call back the scenario drawing instruction after the separation module 318 stores data of a dynamic object and data of a static object of the scenario image of the real frame N in the cache 320, so that the graphics library draws the scenario image of the real frame N. The callback module 324 is further configured to call back the UI drawing instruction after the identification module 316 stores the UI image data drawn by using the UI drawing instruction in the cache, so that the graphics library draws the UI image of the real frame N. The callback module 324 is further configured to call back the image display instruction when the identification module 316 identifies the image display instruction, so that the graphics library displays the image of the real frame N. After the graphics library draws and displays the real frame N, the display module 332 displays the prediction image frame N+1.

Specifically, when the interception module 314 replaces the function pointer list in the graph library, the callback module 334 may back up an original function pointer P1 (where the pointer P1 points to an implementation function corresponding to an original function in the graphics library), an interception function pointer P2 (where the pointer P2 may point to an implementation function corresponding to an original function in the identification module), and a callback function pointer P3 (where P3=P1, that is, P3 also points to the implementation function corresponding to the original function in the graphics library) in the graph library. For example, the interception module may replace the pointer P1 with the interception function pointer P2, to intercept the drawing instruction stream of the real frame. The callback module 334 may call back the drawing instruction stream of the image frame to the graphics library by using the callback function pointer P3, so that the graphics library draws the image frame. For example, when the identification module 316 identifies the scenario image instruction, the callback module 334 calls back the scenario drawing instruction by using the pointer P3. Alternatively, after the identification module 316 stores the object data in the cache, the callback module 334 calls back the scenario image instruction by using the pointer P3. Alternatively, when the identification module 316 identifies the UI drawing instruction, the callback module 334 calls back the UI drawing instruction by using the pointer P3. Alternatively, after the identification module 316 stores the UI drawing image in the cache, the callback module 334 calls back the scenario image instruction by using the pointer P3. Alternatively, when the identification module 316 identifies the image display instruction, the callback module 334 calls back the image display instruction by using the pointer P3.

In an example, the callback module 334 may further call back the image display instruction after the combination module constitutes the prediction image frame.

Figure 4:
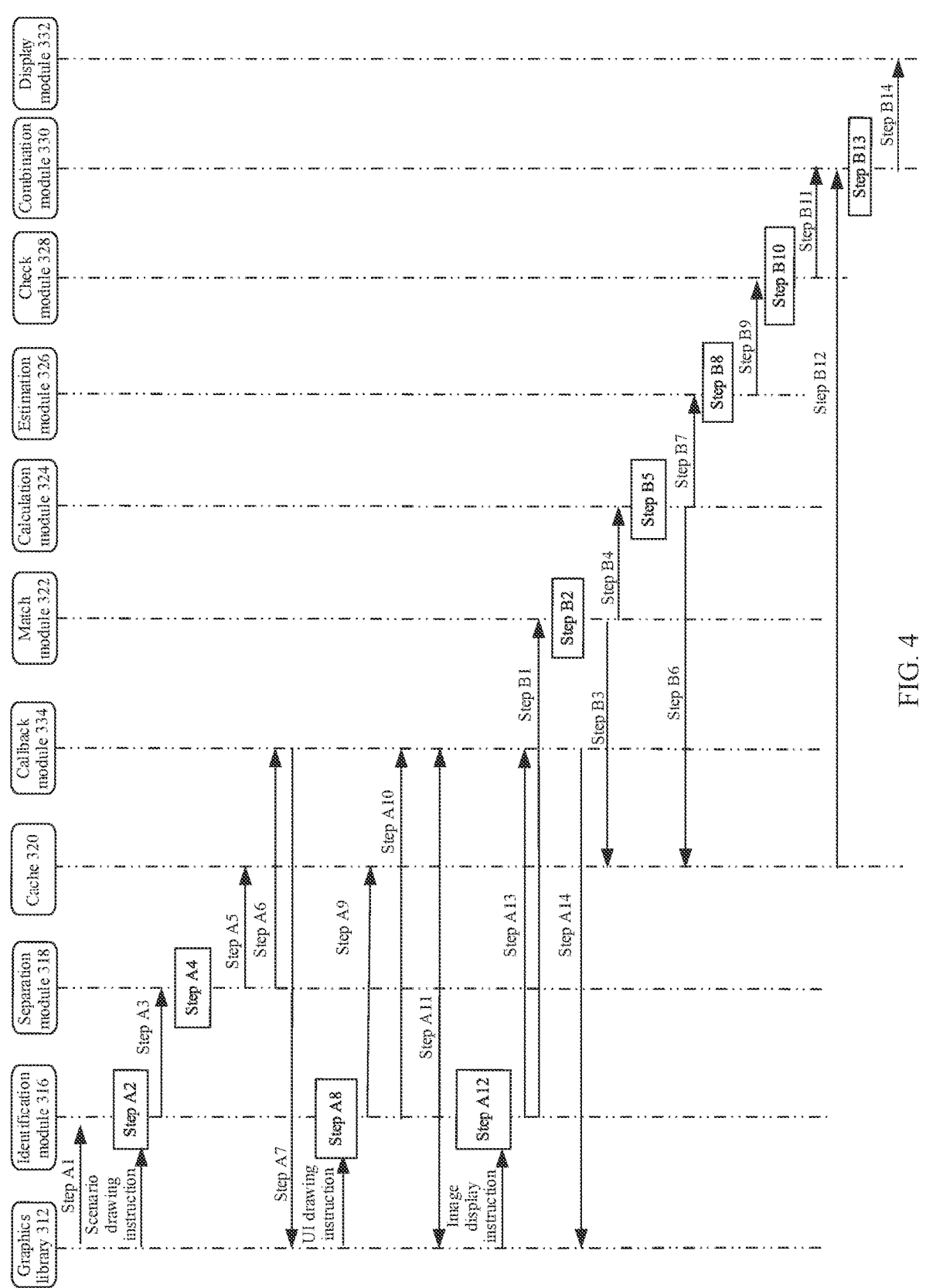
FIG. 4 is a schematic diagram of discarding some drawing instructions in a drawing instruction stream according to an embodiment of the present disclosure.

The following further explains and describes the prediction method shown in this application with reference to FIG. 2, FIG. 3, and FIG. 4. FIG. 4 is a schematic diagram of interaction between modules at a system framework layer in FIG. 3.

The following specifically uses an example in which the drawing instruction stream of the image frame intercepted by the interception module 314 in the graphics library is the drawing instruction stream of the real frame N, to describe the prediction method shown in this application.

Step A1: The interception module 314 in the graphics library 312 invokes the identification module 316, so that the identification module 316 identifies a drawing instruction in a drawing instruction stream of a real frame N intercepted by the interception module 314.

As shown above, the drawing instruction stream generally includes three drawing instructions, such as a scenario drawing instruction, a UI drawing instruction, and an image display instruction.

Step A2: When the drawing instruction identified by the identification module 316 is a scenario drawing instruction, the identification module 316 may invoke the separation module 318 (step A3), so that the separation module 318 separates a dynamic object from a static object in a scenario image.

Step A4: The separation module 318 separates the dynamic object from the static object in the scenario image corresponding to the scenario drawing instruction, and then stores the dynamic object and the static object that are separated in the cache 320 (step A5).

Step A6: After storing the dynamic object and the static object that are separated in the cache 320, the separation module 318 may invoke the callback module 334, and the callback module 334 calls back the scenario drawing instruction (step A7), so that the graphics library draws a scenario image of the real frame N.

Step A8: When the drawing instruction identified by the identification module 316 is a UI drawing instruction, the identification module 316 caches a UI image corresponding to the UI drawing instruction (step A9).

Step A10: The identification module 316 caches the UI image corresponding to the UI drawing instruction, and then invokes the callback module 334, and the callback module 334 calls back the UI drawing instruction (step A11), so that the graphics library draws a UI image of the real frame N.

Step A12: When the drawing instruction identified by the identification module 316 is an image display instruction, the identification module 316 invokes the callback module 334 (step A13), and the callback module 334 calls back the image display instruction (step A14), so that the graphics library displays the drawn image of the real frame N.

Step B1: When the drawing instruction identified by the identification module 316 is an image display instruction, the identification module 316 may invoke the match module 322, and the match module 322 matches an object in the real frame N against an object in a real frame N–2 (step B2).

Step B2: After matching the object in the real frame N against the object in the real frame N–2, the match module 322 may cache data of the matched object.

Step B3: After matching the object in the real frame N against the object in the real frame N–2, the match module 322 invokes the calculation module 324, and the calculation module 324 calculates a motion vector between the matched objects in the real frame N and the real frame N–2, to constitute a motion vector graph between the real frame N and the real frame N–2, and calculates a motion vector graph between the real frame N and a real frame N+1 based on the motion vector graph between the real frame N and the real frame N–2 and a motion vector graph between the real frame N–2 and a real frame N–4 (step B5).

Step B6: The calculation module 324 stores an estimation motion vector graph in the cache 320.

Step B7: After storing the estimation motion vector graph in the cache 320, the calculation module 324 invokes the estimation module 326, and the estimation module 326 performs motion estimation on the object in the real frame N based on the estimation motion vector graph and scenario image data of the real frame N, to obtain a prediction scenario image of a prediction frame N+1 (step B8).

Step B9: After obtaining the prediction scenario image of the prediction frame N+1, the estimation module 326 invokes the check module 328, and the check module 328 checks the prediction scenario image (step B10).

Step B11: After checking the prediction scenario image, the check module 328 invokes the combination module 330, and the combination module 330 obtains the prediction scenario image from the cache (step B12). The combination module 330 combines the prediction scenario image with the UI image to obtain the prediction image frame N+1 (step B13).

Step B14: The combination module 330 sends the prediction image frame N+1 to the display module 332, and the display module 332 displays the prediction image frame after the real frame N is displayed.

According to the prediction method shown in the foregoing embodiment, the prediction frame is displayed, so that fewer resources can be consumed by a GPU to execute a drawing instruction, and therefore load of an electronic device can be reduced.

FIG. 7 specifically shows an image frame prediction method according to an embodiment of this application. The method may be applied to the electronic device 100, and specifically includes the following steps.

Step 702: Obtain a drawing instruction stream of a first image frame.

Step 704: Obtain one or more first objects in the first image frame according to a first-type drawing instruction in the drawing instruction stream of the first image frame, where the first-type drawing instruction is a scenario drawing instruction.

Step 706: Obtain one or more second objects in the first image frame according to a second-type drawing instruction in the drawing instruction stream of the first image frame, where the second-type drawing instruction is a control drawing instruction.

Step 708: Obtain one or more third objects in a second image frame.

Step 710: Calculate a first motion vector between the one or more first objects and the one or more third objects, where the one or more third objects match the one or more first objects, and the second image frame is an image frame before the first image frame.

Step 712: Obtain a second motion vector, where the second motion vector is a motion vector between the one or more third objects and one or more fourth objects in a third image frame, the one or more third objects match the one or more fourth objects, and the third image frame is an image frame before the second image frame.

Step 714: Calculate a third motion vector based on the first motion vector and the second motion vector.

Step 716: Obtain a first prediction image frame based on the first motion vector, the third motion vector, and the one or more first objects.

Step 720: Combine the first prediction image frame with the one or more second objects, to obtain a second prediction image frame.

Figure 8:
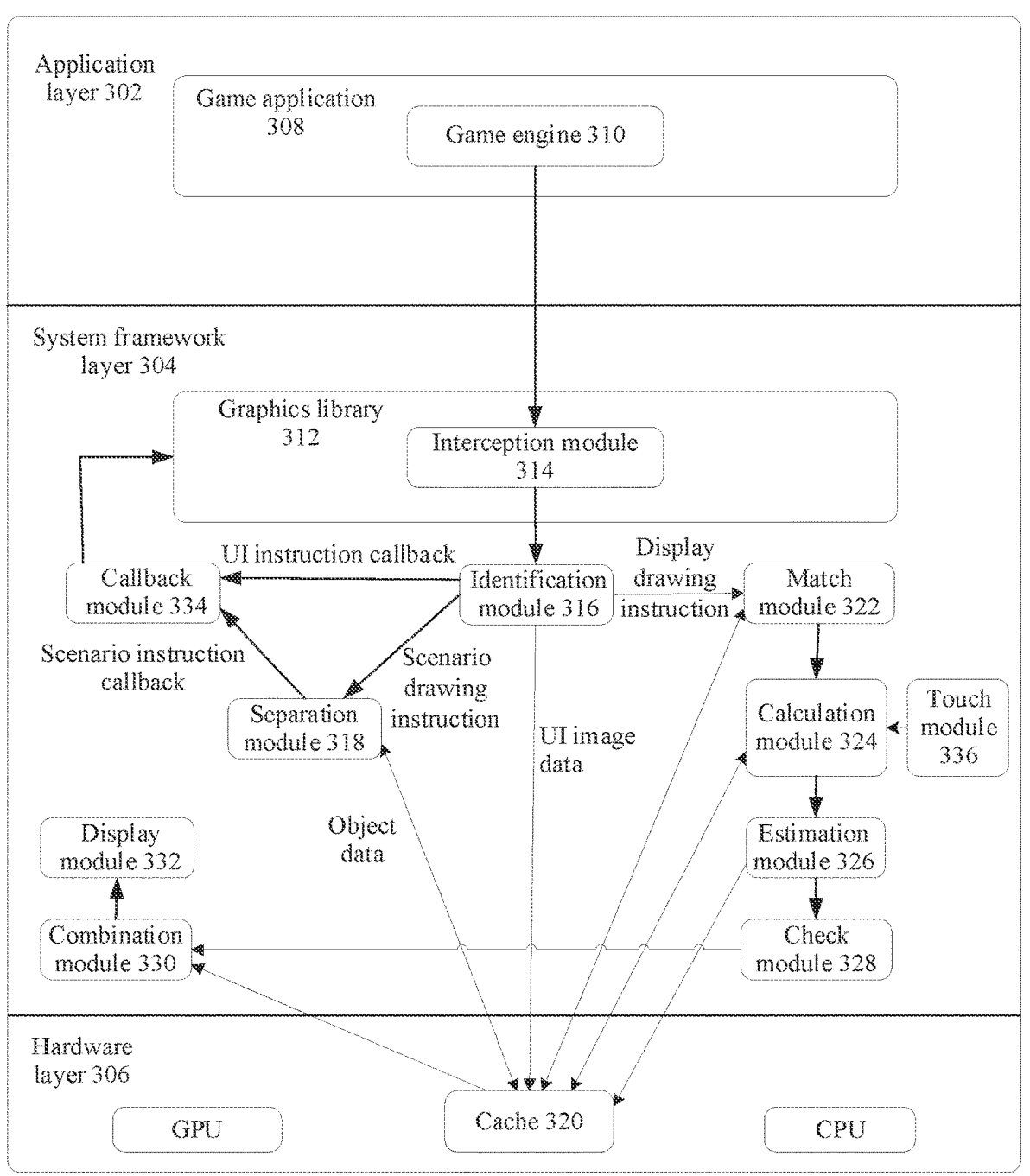
FIG. 8 shows a hardware layer and a software layer at which an image frame prediction method is performed according to another embodiment of the present disclosure.

FIG. 8 is a framework diagram of a software layer and a hardware layer of an image frame calibration method performed by the electronic device 100 according to an embodiment of this application. It may be understood that the framework diagram shown in FIG. 8 may also be used to implement the prediction method shown in the foregoing embodiment.

In the prediction method shown in the foregoing embodiment, a real frame and a prediction frame are alternately displayed, and the prediction frame is obtained by predicting the real frame. A game has a high requirement on real-time display of a picture, and a display lag affects a display effect of the game greatly. Therefore, a prediction frame can only be obtained by predicting a real frame before the prediction frame. However, a game application also lacks a post-frame feedback correction mechanism. For example, a prediction frame N+1 is obtained by predicting a real frame N, a real frame N−2, and a real frame N−4. Because a picture of the generated prediction frame N+1 cannot be corrected based on the subsequent real frame N+2, an estimated motion vector used in a motion estimation process may be relatively different from an actual motion vector. Consequently, deterioration of the picture may occur in a display process of the prediction frame, and game experience of a user on a terminal device is affected.

Based on this, this application further proposes another image frame calibration method.

In the foregoing embodiment, when the electronic device 100 obtains the prediction frame N+1 based on the real frame N, the real frame N−2, and the real frame N−4, the calculation module 324 may obtain an estimated motion vector graph Y3 {y1 (N, N+1), y2 (N, N+1), y3 (N, N+1)} by using a motion vector graph Y1 {y1 (N−4, N−2), y2 (N−4, N−2), y3 (N−4, N−2)} between objects in the real frame N and the real frame N−2 and a motion vector graph Y2 {y1 (N−2, N), y2 (N−2, N), y3 (N−2, N)} between objects in the real frame N−4 and the real frame N−2. The electronic device may shift an object in the real frame N based on a vector in the estimated motion vector graph, to obtain the prediction frame N+1.

In an embodiment of this application, after calculating the estimated motion vector graph Y3 {y1 (N, N+1), y2 (N, N+1), y3 (N, N+1)}, the calculation module 324 may store the estimated motion vector graph Y3 in the cache 320. When a drawing instruction stream intercepted by the interception module 314 is a drawing instruction stream of the real frame N+2, the identification module 316 identifies the drawing instruction stream of the real frame N+2. The separation module 318 separates a static object from a dynamic object in a scenario image of the real frame N+2 based on a scenario drawing instruction in the drawing instruction stream of the real frame N+2, and stores the static object and the dynamic object in the scenario image of the real frame N+2 in the cache. The identification module 316 stores UI image data in the cache based on a UI drawing instruction in the drawing instruction stream.

Further, the match module 322 matches a dynamic object in the real frame N+2 against that in the real frame N, and matches a static object in the real frame N+2 against that in the real frame N. The calculation module 324 may calculate a motion vector graph Y4 {y1 (N, N+2), y2 (N, N+2), y3 (N, N+2)} between objects in the real frame N+2 and the real frame N.

It may be understood that, based on the foregoing embodiment, the calculation module 324 may calculate an estimated motion vector graph Y5 between the real frame N+2 and a prediction frame N+3 based on the motion vector graph Y1 between the objects in the real frame N and the real frame N−2 and the motion vector graph Y4 between the objects in the real frame N+2 and the real frame N. However, as shown above, deterioration of a picture may occur. In an embodiment of this application, before the estimated motion vector graph Y5 is calculated, it may be first determined whether there is a large error in a prediction result of the prediction frame N+1. If there is a large error, a check may be performed in advance when the estimated motion vector graph between the real prediction frame N+2 and the prediction frame N+3 is predicted, so as to prevent a poor prediction frame N+3.

In an embodiment, the calculation module 324 may calculate a motion vector graph $X_1$ between objects in the prediction frame N+1 and the real frame N, and then determine, based on the motion vector graph Y4 between the objects in the real frame N+2 and the real frame N, whether there is a large error in a prediction result of the prediction frame N+1. For example, the calculation module 324 may calculate a first difference between corresponding vectors in the motion vector graph $X_1$ and the motion vector graph Y4, and compare the first difference with half of each corresponding vector in the motion vector graph Y4, for example, by performing a subtraction operation, to obtain a second difference. A larger absolute value of the second difference indicates a more inaccurate prediction result. Therefore, when the estimated motion vector graph between the real frame N+2 and the prediction frame N+3 is calculated, the second difference may be used as a parameter to participate in calculating the estimated motion vector graph between the real frame N+2 and the prediction frame N+3.

Figure 9:
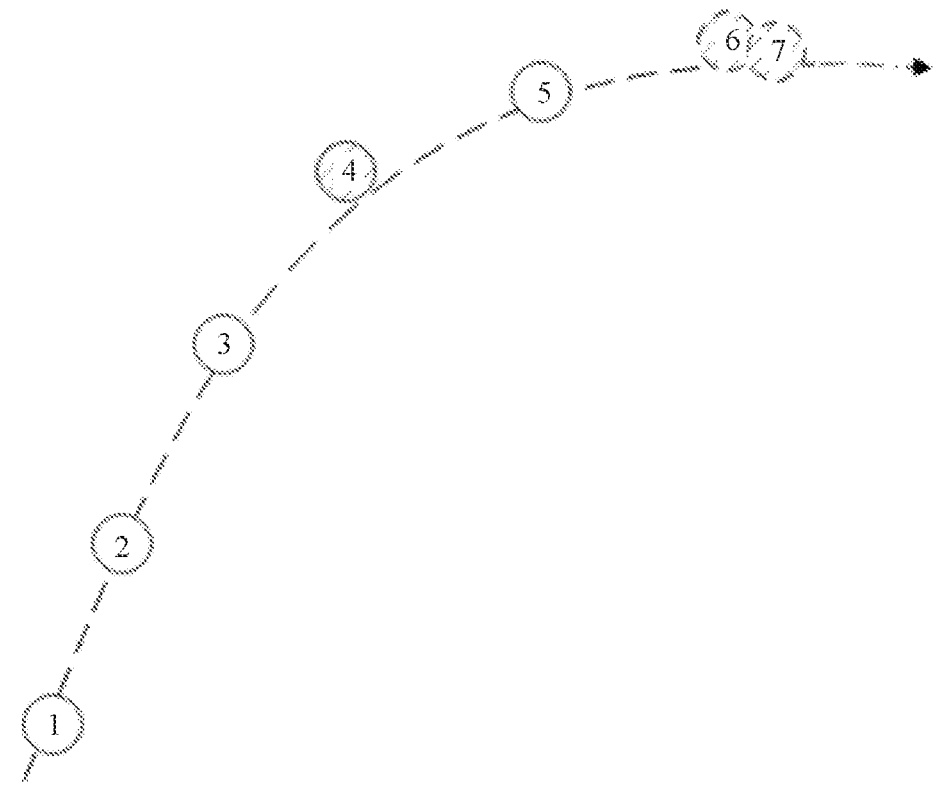
FIG. 9 is an example diagram of an object track change in a calibration method according to an embodiment of this application.

The foregoing image frame calibration method is described with reference to FIG. 2 and FIG. 9. FIG. 9 is an example diagram of an object track change in the calibration method according to an embodiment of this application.

In FIG. 9, a circle represents a same object included in consecutively displayed real frames, and locations 1, 2, and 3 are locations of an object in three consecutive real frames. For example, the locations 1, 2, and 3 are respectively locations in a real frame N−4, a real frame N−2, and a real frame N. A slashed-line arrow represents an actual motion direction, and a location 4 is a location of the object in a prediction frame N+1. By using the foregoing calibration method, the calculation module 324 may calculate a first difference between corresponding vectors in a motion vector graph X₁ and a motion vector graph Y4, perform a subtraction operation between the first difference and half of each corresponding vector in the motion vector graph Y4, to obtain a second difference, and determine, by using the second difference, that a deviation between the location 4 and an actual motion location of the object is excessively large. The calculation module 324 uses the second difference as a calibration parameter to participate in calculating an estimated motion vector graph between a real frame N+2 and a prediction frame N+3, so as to perform first calibration on a location of the object in the prediction frame N+3. For example, 5 represents a location of the object in the real frame N+2, 6 represents a location that is of the object 6 in the prediction N+3 and that is predicted according to the foregoing embodiment, and 7 represents a location in the prediction frame N+3 after data calibration of the real frame N+2, that is, 7 a location after the first calibration.

An operation of a user affects a location of an object in an image frame. For example, a quantity of times that the user frequently performs an operation on a control or an operation location affects an angle and a speed at which each object in the image frame changes. Therefore, the foregoing calibration method may further calibrate the generated prediction frame based on a location relationship between a touch location of the user and a UI image (such as a game wheel).

As shown in FIG. 8, the system framework layer further includes a touch module 336. When the electronic device displays the real frame N, the touch module 336 may obtain location information at which the user touches a display of the electronic device, and the location information may further include a distance between the touch location of the user and a preset UI image (such as a game wheel). After obtaining the location information, the touch module 336 sends the location information to the calculation module. The calculation module 336 may perform further calibration on the prediction frame N+3 based on the location information and the foregoing second difference. For example, the calculation module 324 may participate in calculating the estimated motion vector graph between the real frame N+2 and the prediction frame N+3 based on the second difference and the foregoing location information, so as to check the predicted location of the object.

Based on the foregoing calibration method, accuracy of the prediction frame can be further improved.

An embodiment of this application further provides a computer-readable storage medium. The computer-readable storage medium includes computer instructions. When the computer instructions are run on an electronic device, the electronic device is enabled to perform the prediction method provided in this application.

In embodiments of this application, each functional unit may be integrated into one processing unit, or each unit may exist separately physically, or two or more units may be integrated into one unit. The foregoing integrated unit may be implemented in a form of hardware, or may be implemented in a form of a software functional unit.

If the integrated unit is implemented in the form of the software functional unit and sold or used as an independent product, the integrated unit may be stored in the computer-readable storage medium. Based on such an understanding, the technical solutions of embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any change or replacement within the technical scope disclosed in this application shall fall within the protection scope of this application. Therefore, the protection scope of this application shall be subject to the protection scope of the claims.

What is claimed is:

1. An image prediction method, comprising:

obtaining, by a processor in an electronic device, a drawing instruction stream of a first image frame, wherein the first image frame includes one or more first objects;

obtaining, by the processor, the one or more first objects in the first image frame according to a first-type drawing instruction in the drawing instruction stream of the first image frame, wherein the first-type drawing instruction is a scenario drawing instruction and the one or more first objects are drawn in the first image frame based on the scenario drawing instruction;

obtaining, by the processor, one or more second objects in the first image frame according to a second-type drawing instruction in the drawing instruction stream of the first image frame, wherein the second-type drawing instruction is a control drawing instruction and the one or more second objects are drawn in the first image frame based on the control drawing instruction;

obtaining, by the processor, one or more third objects in a second image frame, wherein the second image frame is an image frame before the first image frame;

calculating, by the processor, a first motion vector between the one or more first objects and the one or more third objects, wherein the one or more third objects match the one or more first objects;

obtaining, by the processor, a second motion vector, wherein the second motion vector is a motion vector between the one or more third objects and one or more fourth objects in a third image frame, wherein the one or more third objects match the one or more fourth objects, and the third image frame is an image frame before the second image frame;

calculating, by the processor, a third motion vector based on the first motion vector and the second motion vector;

obtaining, by the processor, a first prediction image frame based on the first motion vector, the third motion vector, and the one or more first objects;

combining, by the processor, the first prediction image frame with the one or more second objects to obtain a second prediction image frame; and causing, by the processor, the second prediction image frame to be displayed on a display device after the first image frame is displayed on the display device.

2. The image prediction method according to claim 1, wherein before the obtaining the drawing instruction stream of the first image frame, the method further comprises:

replacing a first pointer in a pointer list with a second pointer, wherein the first pointer points to a first function, the second pointer points to a second function, the first function is used to draw the first image frame, and the second function is used to identify a drawing instruction in the drawing instruction stream of the first image frame.

3. The image prediction method according to claim 2, further comprising:

identifying the drawing instruction in the drawing instruction stream of the first image frame based on the second function, to determine the first-type drawing instruction, the second-type drawing instruction, and a third-type drawing instruction in the drawing instruction stream of the first image frame.

4. The image prediction method according to claim 1, wherein before the obtaining the one or more third objects in the second image frame, the method further comprises:

obtaining a drawing instruction stream of the second image frame;

obtaining the one or more third objects in the second image frame according to the first-type drawing instruction in the drawing instruction stream of the second image frame; and storing the one or more third objects in the second image frame.

5. The image prediction method according to claim 4, wherein the obtaining the one or more third objects in the second image frame comprises:

obtaining the one or more third objects in the second image frame according to a third-type drawing instruction in the drawing instruction stream of the first image frame, wherein the third-type drawing instruction is an image display instruction.

6. The image prediction method according to claim 1, wherein the one or more first objects comprise a fifth object, the one or more third objects comprise a sixth object, the one or more fourth objects comprise a seventh object, that the one or more first objects match the one or more third objects is that an identifier of the fifth object is the same as an identifier of the sixth object, and that the one or more third objects match the one or more fourth objects is that the identifier of the sixth object is the same as an identifier of the seventh object.

7. The image prediction method according to claim 1, wherein P image frames are spaced between the first image frame and the second image frame, Q image frames are spaced between the second image frame and the third image frame, and P and Q are positive integers.

8. The image prediction method according to claim 6, wherein the one or more first objects comprise the fifth object and an eighth object, the one or more third objects comprise the sixth object and a ninth object, the identifier of the fifth object is the same as the identifier of the sixth object, and an identifier of the eighth object is the same as an identifier of the ninth object, wherein the method further comprises:

obtaining vertex information of the sixth object based on the identifier of the fifth object;

determining, based on the vertex information of the fifth object being different from the vertex information of the sixth object, that the fifth object is a dynamic object;

obtaining vertex information of the ninth object based on the identifier of the eighth object;

determining, based on the vertex information of the eighth object being the same as the vertex information of the ninth object, that the eighth object is a static object;

recording the fifth object as the dynamic object; and recording the eighth object as the static object.

9. The image prediction method according to claim 8, wherein the calculating the first motion vector between the one or more first objects and the one or more third objects comprises:

calculating a first motion component of the first motion vector based on coordinates of the fifth object and coordinates of the sixth object; and calculating a second motion component of the first motion vector based on coordinates of the eighth object and coordinates of the ninth object.

10. The image prediction method according to claim 1, wherein before the obtaining the second motion vector, the method further comprises:

obtaining a drawing instruction stream of the third image frame;

obtaining the one or more fourth objects in the third image frame according to a first-type drawing instruction in the drawing instruction stream of the third image frame; and storing the one or more fourth objects;

wherein after the obtaining the one or more third objects in the second image frame, the method further comprises:

calculating the second motion vector between the one or more third objects and the one or more fourth objects; and storing the second motion vector.

11. The image prediction method according to claim 6, wherein the one or more fourth objects comprise the seventh object and a tenth object, the identifier of the sixth object is the same as the identifier of the seventh object, and the identifier of the ninth object is the same as an identifier of the tenth object; and wherein the calculating the second motion vector between the one or more third objects and the one or more fourth objects comprises:

calculating a first motion component of the second motion vector based on the coordinates of the sixth object and coordinates of the seventh object; and calculating a second motion component of the second motion vector based on the coordinates of the ninth object and coordinates of the tenth object.

12. The image prediction method according to claim 7, wherein P=Q=1, and the calculating the third motion vector based on the first motion vector and the second motion vector comprises:

using half of a difference between the second motion vector and the first motion vector as the third motion vector.

13. The image prediction method according to claim 9, wherein the obtaining the first prediction image frame based on the first motion vector, the third motion vector, and the one or more first objects comprises:

obtaining prediction coordinates of the fifth object based on a sum of half of the first motion component of the first motion vector, a first motion component of the third motion vector, and the coordinates of the fifth object;

obtaining prediction coordinates of the eighth object based on a sum of half of the second motion component of the first motion vector, a second motion component of the third motion vector, and the coordinates of the eighth object; and obtaining the first prediction image frame based on the prediction coordinates of the fifth object and the prediction coordinates of the eighth object.

14. The image prediction method according to claim 1, further comprising:

discarding a drawing instruction stream of an image frame between the first image frame and the second image frame; and discarding a drawing instruction stream of an image frame between the second image frame and the third image frame.

15. The image prediction method according to claim 1, further comprising:

drawing the drawing instruction stream of the first image frame.

16. An electronic device, comprising:

a processor; and a storage device, wherein the storage device stores program instructions, wherein when the program instructions are run by the processor, the processor is enabled to perform operations comprising:

obtaining a drawing instruction stream of a first image frame, wherein the first image frame includes one or more first objects;

obtaining the one or more first objects in the first image frame according to a first-type drawing instruction in the drawing instruction stream of the first image frame, wherein the first-type drawing instruction is a scenario drawing instruction and the one or more first objects are drawn in the first image frame based on the scenario drawing instruction;

obtaining one or more second objects in the first image frame according to a second-type drawing instruction in the drawing instruction stream of the first image frame, wherein the second-type drawing instruction is a control drawing instruction and the one or more second objects are drawn in the first image frame based on the control drawing instruction;

obtaining one or more third objects in a second image frame, wherein the second image frame is an image frame before the first image frame;

calculating a first motion vector between the one or more first objects and the one or more third objects, wherein the one or more third objects match the one or more first objects;

obtaining a second motion vector, wherein the second motion vector is a motion vector between the one or more third objects and one or more fourth objects in a third image frame, wherein the one or more third objects match the one or more fourth objects, and the third image frame is an image frame before the second image frame;

calculating a third motion vector based on the first motion vector and the second motion vector;

obtaining a first prediction image frame based on the first motion vector, the third motion vector, and the one or more first objects;

combining the first prediction image frame with the one or more second objects to obtain a second prediction image frame; and causing the second prediction image frame to be displayed on a display device after the first image frame is displayed on the display device.

17. A non-transitory computer-readable storage medium comprising computer instructions, wherein when the computer instructions are run on a processor included in an electronic device, the processor is enabled to perform operations comprising:

obtaining a drawing instruction stream of a first image frame, wherein the first image frame includes one or more first objects;

obtaining the one or more first objects in the first image frame according to a first-type drawing instruction in the drawing instruction stream of the first image frame, wherein the first-type drawing instruction is a scenario drawing instruction and the one or more first objects are drawn in the first image frame based on the scenario drawing instruction;

obtaining one or more second objects in the first image frame according to a second-type drawing instruction in the drawing instruction stream of the first image frame, wherein the second-type drawing instruction is a control drawing instruction and the one or more second objects are drawn in the first image frame based on the control drawing instruction;

obtaining one or more third objects in a second image frame, wherein the second image frame is an image frame before the first image frame;

calculating a first motion vector between the one or more first objects and the one or more third objects, wherein the one or more third objects match the one or more first objects;

obtaining a second motion vector, wherein the second motion vector is a motion vector between the one or more third objects and one or more fourth objects in a third image frame, wherein the one or more third objects match the one or more fourth objects, and the third image frame is an image frame before the second image frame;

calculating a third motion vector based on the first motion vector and the second motion vector;

obtaining a first prediction image frame based on the first motion vector, the third motion vector, and the one or more first objects;

combining the first prediction image frame with the one or more second objects to obtain a second prediction image frame; and causing the second prediction image frame to be displayed on a display device after the first image frame is displayed on the display device.

* * * * *